United States Patent
Pangerc et al.

(10) Patent No.: US 8,328,474 B2
(45) Date of Patent: Dec. 11, 2012

(54) QUICK CHANGE ARBOR, HOLE CUTTER, AND METHOD

(75) Inventors: James E. Pangerc, East Longmeadow, MA (US); Joseph Thomas Novak, East Longmeadow, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 1162 days.

(21) Appl. No.: 12/043,740

(22) Filed: Mar. 6, 2008

(65) Prior Publication Data

US 2009/0226270 A1    Sep. 10, 2009

(51) Int. Cl.
*B23B 51/05* (2006.01)

(52) U.S. Cl. .............. 408/204; 408/206; 408/239 R; 408/1 R

(58) Field of Classification Search .......... 408/204–206, 408/238, 239 R, 239 A, 703, 1 R; B23B 51/04, B23B 51/05
See application file for complete search history.

(56) References Cited

U.S. PATENT DOCUMENTS

| | | | |
|---|---|---|---|
| 3,784,316 A | | 1/1974 | Bittern |
| 4,036,560 A | | 7/1977 | Clark et al. |
| 4,148,593 A | | 4/1979 | Clark |
| 4,303,357 A | * | 12/1981 | Makar ............... 408/204 |
| 4,490,080 A | | 12/1984 | Kezran |
| 4,651,600 A | | 3/1987 | Zettl |
| 5,035,548 A | | 7/1991 | Pidgeon |
| 5,076,741 A | | 12/1991 | Littlehorn |
| 5,108,235 A | | 4/1992 | Czyzewski |
| 5,154,552 A | * | 10/1992 | Koetsch ............ 408/204 |
| 5,226,762 A | | 7/1993 | Ecker |
| 5,246,317 A | | 9/1993 | Koetsch et al. |
| 5,352,071 A | | 10/1994 | Cochran et al. |
| 5,658,102 A | * | 8/1997 | Gale ................. 408/1 R |
| 5,813,802 A | | 9/1998 | Ajimi et al. |
| 5,868,532 A | * | 2/1999 | Spenser .............. 408/204 |

(Continued)

FOREIGN PATENT DOCUMENTS

| | | | |
|---|---|---|---|
| EP | 589108 A1 | * | 3/1994 |
| GB | 2 295 110 A | | 5/1996 |
| JP | 57201114 A | * | 12/1982 |
| JP | 7241840 A | | 9/1995 |
| JP | 07241840 A | * | 9/1995 |
| JP | 9117814 A | | 5/1997 |
| JP | 2002096222 A | | 4/2002 |
| JP | 2004181622 A | | 7/2004 |
| JP | 2004216508 A | | 8/2004 |
| JP | 2006198699 A | | 8/2006 |
| WO | WO 03/024677 A1 | | 3/2003 |
| WO | WO 2004011179 A1 | * | 2/2004 |
| WO | WO 2005120754 A1 | * | 12/2005 |
| WO | WO 2008/064409 A1 | | 6/2008 |

OTHER PUBLICATIONS

International Preliminary Report on Patentability for International Application No. PCT/US2009/036413, issued Sep. 7, 2010. International Search Report for International Application No. PCT/US2009/036413, mailed Jun. 24, 2009.
Supplementary European Search Report for European Application No. EP 09 71 6790, completed Aug. 1, 2011.

*Primary Examiner* — Daniel Howell
(74) *Attorney, Agent, or Firm* — McCarter & English, LLP

(57) ABSTRACT

An arbor is provided for both quick change and standard hole saws. Each hole saw includes a central aperture and at least one drive pin aperture. The arbor comprises an arbor body including an end portion engageable within the central aperture, a drive shank opposite the end portion for engaging a power tool, and an axially extending pilot bit aperture for receiving either a quick change pilot bit or standard pilot bit. The arbor further comprises a drive pin plate having at least one drive pin receivable in a corresponding drive pin aperture of the hole saw for drivingly engaging the hole saw. The arbor further comprises a pilot bit mechanism having a first state for engaging a quick change pilot bit, a second state for engaging a standard pilot bit, and a third state for disengaging and releasing the inserted quick change or standard pilot bit from the arbor body.

43 Claims, 13 Drawing Sheets

U.S. PATENT DOCUMENTS

| | | |
|---|---|---|
| 6,120,221 A | 9/2000 | Alm |
| 6,341,925 B1 | 1/2002 | Despres |
| 6,623,220 B2 | 9/2003 | Nuss et al. |
| 6,641,338 B2 | 11/2003 | Despres |
| 6,705,807 B1 | 3/2004 | Rudolph et al. |
| 7,001,119 B2 | 2/2006 | Wendzina et al. |
| 7,073,992 B2 | 7/2006 | Korb et al. |
| 7,104,738 B2 | 9/2006 | Cantlon |
| 7,219,753 B2 | 5/2007 | Gaul |
| 7,488,146 B2 * | 2/2009 | Brunson ............ 408/204 |
| 2002/0122703 A1 | 9/2002 | Czyzewski et al. |
| 2002/0131835 A1 | 9/2002 | Despres |
| 2005/0025591 A1 * | 2/2005 | Korb et al. ............ 408/204 |
| 2007/0036620 A1 * | 2/2007 | Keightley ............ 408/204 |
| 2007/0071565 A1 | 3/2007 | Singh et al. |
| 2007/0160434 A1 | 7/2007 | Gillissen |
| 2007/0160435 A1 | 7/2007 | Chao |
| 2007/0212179 A1 | 9/2007 | Khangar et al. |
| 2008/0019785 A1 | 1/2008 | Keightley |

\* cited by examiner

QUICK CHANGE ARBOR, HOLE CUTTER, AND METHOD

FIELD OF THE INVENTION

The present invention relates arbors for hole cutters, hole cutters, and related methods, and more particularly, to arbors, hole cutters and related methods facilitating relatively quick attachment and release of a hole cutter and/or pilot bit to and from the arbor.

BACKGROUND

A typical arbor for a hole saw includes an arbor body with a threaded end portion that engages a corresponding threaded aperture in the end plate of the hole saw to secure the hole saw to the arbor. A pilot drill bit is receivable within the threaded end portion of the arbor body and extends through the center of the hole saw. The arbor further includes a drive pin plate that slidably mounts to the arbor body and has a pair of diametrically opposed drive pins that extend into corresponding drive pin holes formed in the end plate of the hole saw to rotatably drive the hole saw. A lock nut is threadedly mounted on the arbor body to prevent disengagement of the drive pins from the hole saw during use.

To mount the hole saw to the arbor, the end plate of the hole saw is threaded onto the threaded end portion such that the hole saw is secured to the arbor body and the drive pin holes are in alignment with the corresponding drive pins of the drive pin plate. Then the lock nut is tightened until the drive pins are fully received by the drive pin holes to secure the arbor to the hole saw. To mount the pilot bit, the bit is inserted into the center hole and secured by tightening a fastener.

One of the drawbacks associated with this type of arbor is that hole saws will lock up on the threads if the drive pin plate disengages from the hole saw during operation, presenting the end user with a difficult and time consuming task of removing the hole saw from the arbor. In many circumstances, the process of removing a locked up hole saw from the arbor permanently damages the arbor, the hole saw or both, necessitating the unwanted expense associated with replacing equipment prematurely.

Another drawback of this type of arbor is that it can be necessary to hold the hole saw in place to maintain alignment of the drive pin holes with the corresponding drive pins while simultaneously tightening the lock nut to avoid rotation of the hole saw that otherwise would prevent the drive pins from entering the drive pin holes. To address this problem, proprietary arbors have been devised that accept corresponding proprietary hole saws specifically designed to make hole saw mounting an easier task. However, the versatility of these arbors is greatly limited because they can only mount the particular manufacturer's proprietary hole saws and are not able to mount standard hole saws. Accordingly, it would be advantageous for such proprietary arbors to accept standard hole saws because they tend to be readily available in the event a proprietary hole saw needs replacing and is not available, or in the event a proprietary hole saw is not available in a desired size and/or cutting configuration.

Still another drawback of this type of arbor is that the process of inserting and removing pilot drill bits frequently requires the end user to manually engage a set screw. To address this issue, proprietary arbors have been devised that secure corresponding proprietary pilot drill bits having shanks configured for securement without the necessity of tools. However, the versatility of these arbors is greatly limited because they can only secure the particular manufacturer's proprietary pilot drill bits, and are not able to secure standard pilot drill bits which are readily available and easily obtainable in the event a proprietary pilot drill bit needs replacing and is not available, or in the event a proprietary pilot drill bit is not available in a desired size and/or drilling configuration. Further, such proprietary arbor and pilot drill bit systems can fail at fully securing the bits inside the arbor and/or can allow the bits to loosen during use causing off-axis wobble, especially at high rotational speeds. Off-axis wobble can cause undesirable vibration of the pilot drill bit that can reduce the drilling life of the bit and/or create an unacceptable degree of inaccuracy during use.

Accordingly, it is an object of the present invention to overcome one or more of the above-described drawbacks and/or disadvantages of the prior art.

SUMMARY OF THE INVENTION

In accordance with a first aspect, the present invention is directed to an arbor that is connectable to a quick change hole cutter, and in some embodiments of the present invention, also is connectable to a standard hole cutter. The hole cutter includes an end portion defining a first aperture, and at least one drive pin recess radially spaced relative to the first aperture. The arbor comprises an arbor body including a stop surface, and a hole cutter connecting portion extending axially from the stop surface and engageable within the first aperture of the hole cutter. A drive pin member defines a second aperture that receives therethrough the arbor body, and is configured to allow relative axial movement, but to prevent relative rotational movement, of the arbor body and drive pin member. The drive pin member further includes a first surface, and at least one drive pin radially spaced relative to the second aperture and extending axially from the first surface. The connecting portion is receivable within the first aperture of the hole cutter to define a first engagement position. The arbor body and/or the hole cutter is movable relative to the other between the first engagement position and a second engagement position to secure the hole cutter to the arbor body. In the second engagement position: (i) the at least one drive pin is substantially aligned with the at least one corresponding drive pin recess of the hole cutter; and (ii) the drive pin member is movable axially relative to the arbor body between a disengaged position axially spaced relative to the hole cutter, and an engaged position wherein the at least one drive pin is received within the corresponding drive pin recess of the hole cutter, and the first surface of the drive pin member contacts the end portion of the hole cutter.

Preferably, in the second engagement position, the end portion of the hole cutter is in contact with the stop surface of the arbor body. In some embodiments of the present invention, the arbor body and/or hole cutter is rotatable relative to the other between the first and second engagement positions. In some such embodiments, the connecting portion of the arbor body defines a first thread, and the first aperture of the hole cutter defines a second thread that is threadedly engageable with the first thread, to fixedly secure the hole cutter to the arbor body in the second engagement position. In some such embodiments, the threads on the connecting portion of the arbor body are configured to both (i) substantially align the at least one drive pin with the corresponding drive pin recess of the hole cutter in the second engagement position, and (ii) place the end portion of the hole cutter in contact with the stop surface of the arbor body in the second engagement position. In some such embodiments, the first and second threads define an axial clearance therebetween allowing the end portion of the hole cutter to substantially contact the stop surface of the arbor body in the both the first engagement position and the second engagement position. In some such embodiments, the arbor body and/or hole cutter is rotatable relative to the other between the first and second engagement positions, and the angular extent between the first and second engagement positions is within the range of about 10° and about 180°.

In some embodiments of the present invention, the first aperture of the quick change hole cutter defines a plurality of angularly extending protrusions, and a plurality of relatively recessed portions formed therebetween; and the connecting portion of the arbor body defines a plurality of angularly extending protrusions, and a plurality of relatively recessed portions formed therebetween. In the first engagement position, the protrusions of the connecting portion are received within the recesses of the first aperture, and the protrusions of the first aperture are received within the recessed portions of the connecting portion. In the second engagement position, the protrusions of the connecting portion are engaged with the protrusions of the first aperture. In some such embodiments, the protrusions of the connecting portion define a first thread, the protrusions of the first aperture define a second thread, and the first and second threads are threadedly engaged with each other in the second engagement position. In some embodiments, at least one of the angularly extending protrusions defines a greater or lesser angular extent than at least one other angular extending protrusion of the respective first aperture and connecting portion, to thereby permit receipt of the connecting portion within the first aperture in only the first engagement position.

Some embodiments of the present invention further comprise a biasing member, such as a coil spring, that normally biases the drive pin member in the direction from the disengaged into the engaged position. Preferably, the biasing member automatically drives the drive pin member into the engaged position upon moving the hole cutter into the second engagement position. One advantage of this feature is that it facilitates one-handed attachment of the hole cutter to the arbor, or otherwise facilitates rapid attachment and detachment of the hole cutter to and from the arbor.

In accordance with another aspect of the present invention, the arbor body further defines a pilot bit aperture that is configured to alternatively receive both a quick change pilot bit and a standard pilot bit. In some such embodiments, the arbor further comprises (i) a pilot pin biased radially inwardly toward the pilot bit aperture and engageable with a quick change pilot bit received within the pilot bit aperture, and (ii) a fastener movable into the pilot bit aperture and engageable with a standard pilot bit received within the pilot bit aperture.

In some such embodiments, the arbor body further defines a pilot bit aperture for alternatively receiving both a quick change pilot bit and a standard pilot bit, and the arbor further comprises a pilot bit mechanism defining (i) a first state wherein the pilot bit mechanism engages the quick change pilot bit to prevent movement of the bit relative to the arbor body; (ii) a second state wherein the pilot bit mechanism engages the standard pilot bit to prevent movement of the bit relative to the arbor body; and (iii) a third state wherein the pilot bit mechanism disengages from the respective quick change pilot bit or standard pilot bit and allows movement of the respective bit relative to the arbor body.

In accordance with another aspect, the present invention is directed to an arbor that is connectable to a quick change hole cutter that includes an end portion defining a first aperture and at least one recess radially spaced relative to the first aperture. The arbor comprises first means for drivingly connecting a power tool to the hole cutter. The first means includes a stop surface, and second means of the arbor extends axially relative to the stop surface for releasably engaging the first aperture of the hole cutter and defining a first engagement position. Third means are provided for receiving therethrough the first means, and for allowing relative axial movement, but preventing relative rotational movement, of the first means and the third means. The third means includes a first surface, and at least one fourth means extending axially from the first surface for receipt within the at least one recess of the hole cutter for rotatably driving the hole cutter. Fifth means are provided for allowing rotational movement of at least one of the first means and the hole cutter relative to the other between the first engagement position and a second engagement position for securing the hole cutter to the first means, and for (i) substantially aligning the at least one fourth means with the at least one corresponding recess of the hole cutter in the second engagement position to, in turn, allow axial movement of the third means relative to the first means in the second engagement position between a disengaged position axially spaced relative to the hole cutter, and an engaged position with the at least one fourth means received within the corresponding recess of the hole cutter, and (ii) placing the first surface of the third means in substantial contact with the stop surface of the hole cutter in the second engagement position.

In accordance with another aspect, the present invention is directed to a quick change hole cutter that is attachable to an arbor. The arbor includes a threaded end portion defining at least one male threaded portion, a stop surface located adjacent to the threaded end portion, and a drive pin member including at least one drive pin thereon and movable axially relative to the arbor between an engaged position with the drive pin engaging the hole cutter, and a disengaged position with the drive pin disengaged from the hole cutter. The quick change hole cutter comprises a blade including a blade body and a cutting edge defined by a plurality of cutting teeth. An end portion of the hole cutter is fixedly secured to the blade body, and defines an approximately central aperture including on a peripheral portion thereof at least one female threaded portion, and at least one drive pin recess radially spaced relative to the central aperture. The female threaded portion cooperates with the male threaded portion of the arbor to define (i) a first engagement position wherein the lead male and female threads engage or substantially engage one another and define a first axial clearance relative to each other, and (ii) a second engagement position angularly spaced relative to the first engagement position. In the second engagement position, the male and female threads engage one another and define a second axial clearance less than the first axial clearance, the end portion is in engagement or substantial engagement with the stop surface of the arbor, and the drive pin recess is aligned with a respective drive pin of the arbor for receiving the drive pin with the drive pin member located in the engaged position.

Preferably, in the second engagement position, the end portion of the hole cutter is in contact with the stop surface of the arbor body. In some embodiments of the present invention, the female threaded portion defines an axial clearance relative to the male threaded portion allowing the end portion of the hole cutter to substantially contact the stop surface of the arbor body in the both the first engagement position and the second engagement position. In some embodiments, the connecting portion of the arbor body defines a plurality of angularly extending protrusions and a plurality of relatively recessed portions formed therebetween; and the central aperture of the quick change hole cutter defines a plurality of angularly extending protrusions, and a plurality of relatively recessed portions formed therebetween. In the first engagement position, the protrusions of the arbor connecting portion are received within the recesses of the central aperture, and the protrusions of the central aperture are received within the recessed portions of the arbor connecting portion. In the second engagement position, the protrusions of the arbor connecting portion are engaged with the protrusions of the central aperture.

In accordance with another aspect, the present invention is directed to a quick change hole cutter that is attachable to an arbor. The arbor includes a threaded end portion defining at least one male threaded portion, a stop surface located adjacent to the threaded end portion, and a drive pin member including at least one drive pin thereon and movable axially relative to the arbor between an engaged position with the drive pin engaging the hole cutter, and a disengaged position with the drive pin disengaged from the hole cutter. The quick change hole cutter comprises first means for cutting a hole, and second means for releasably connecting the first means to the arbor. The second means includes third means for engaging the end portion of the arbor in a first engagement position defining a first axial clearance therebetween, allowing relative rotational movement of the hole cutter and/or arbor relative to the other between the first engagement position and a second engagement position angularly spaced relative to the first engagement position, and defining a second axial clearance therebetween less than the first axial clearance, and for placing the second means in engagement or substantial engagement with the stop surface of the arbor. Fourth means of the hole cutter are aligned with the drive pin of the arbor in the second engagement position for receiving the drive pin with the drive pin member located in the second engaged position.

In accordance with another aspect, the present invention is directed to a method comprising the following steps:

(i) providing an arbor including a connecting portion that is connectable to a quick change hole cutter, wherein the hole cutter includes an end portion defining a first aperture and at least one drive pin recess radially spaced relative to the first aperture, and the arbor includes an axially-elongated arbor body and a drive pin member movable axially, but not rotationally, relative to the arbor body, and including at least one drive pin extending therefrom;

(ii) inserting the connecting portion of the arbor body into the first aperture of the hole cutter to define a first engagement position;

(iii) moving the arbor body and/or hole cutter relative to the other between the first engagement position and a second engagement position and, in turn, securing the hole cutter to the arbor body; and (iv) upon moving the arbor body and/or hole cutter relative to the other into the second engagement position, (i) substantially aligning the at least one drive pin with the at least one corresponding drive pin recess of the hole cutter in the second engagement position, and then either moving or allowing axial movement of the drive pin member relative to the arbor body between a disengaged position axially spaced relative to the hole cutter, and an engaged position with the at least one drive pin axially received within the corresponding drive pin recess of the hole cutter and, in turn, placing the drive pin member in substantial contact with the end portion of the hole cutter.

In some embodiments of the present invention, the method further comprises the steps of:

(i) providing a quick change hole cutter including a first aperture defining along a periphery thereof a plurality of angularly extending protrusions and a plurality of recesses formed therebetween;

(ii) providing an arbor having a connecting portion defining a plurality of angularly extending protrusions and a plurality of recesses formed therebetween;

(iii) inserting at least one of the protrusions of the connecting portion and the protrusions of the first aperture into the recesses of the other in the first engagement position; and (iv) rotating at least one of the hole cutter and arbor body relative to the other from the first engagement position to the second engagement position and, in turn, engaging at least one of the protrusions of the connecting portion and of the first aperture with the other.

Some embodiments of the present invention further comprise the steps of normally biasing the drive pin member in the direction from the disengaged position toward the engaged position, and upon moving the hole cutter from the first engagement position into the second engagement position, automatically biasing the drive pin member into the engaged position to, in turn, drive the drive pin(s) into the corresponding drive pin recess(es) and attach the hole cutter to the arbor.

One advantage of the present invention is that it allows a hole cutter to be relatively quickly engaged with, and disengaged from, the arbor. Yet another advantage of some currently preferred embodiments of the present invention is that one arbor can accept both quick change and standard hole cutters.

Other objects, advantages and features of the present invention and of the currently preferred embodiments thereof will become more readily apparent in view of the following detailed description of the currently preferred embodiments and accompanying drawings.

DETAILED DESCRIPTION OF THE CURRENTLY PREFERRED EMBODIMENTS

Figure 10:
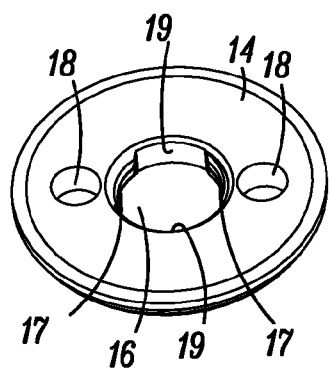
FIG. 10 is a perspective view of the end plate of a quick change hole saw of the present invention.

In FIGS. 1-4, an arbor embodying the present invention is indicated generally by the reference numeral 10. The arbor 10 is usable with hole cutters, such as hole saws and sheet metal hole cutters. The term "hole cutter" is used herein to mean any of numerous different types of cutting tools for cutting holes in work pieces, such as hole saws, sheet metal hole cutters, etc. The term "arbor" is used herein to mean any of numerous different types of devices for supporting a rotating tool, such as a hole cutter, on a power tool such as a drill, and further includes, without limitation, mandrels. As shown, for example, in FIGS. 4 and 10, a typical quick change hole cutter 12 includes an end plate 14 defining a hole cutter aperture 16 extending through a central portion of the end plate, and at least one drive pin aperture 18 radially spaced relative to the aperture 16. In the illustrated embodiment, there are two drive pin apertures 18 radially spaced relative to the aperture 16 and angularly spaced relative to each other by about 180°. However, as may be recognized by those of ordinary skill in the pertinent art based on the teachings herein, any number of drive pin apertures may be provided in any of a variety of shapes and/or configurations. As shown typically in FIG. 4, a blade 13 extends axially from the end plate 14 and defines a plurality of cutting teeth 15 for cutting a hole in a work piece by rotatably driving the arbor 10 and hole cutter 12 and moving the rotatably-driven cutting teeth 15 into the work piece. As described further below, in the quick change hole cutter, the aperture 16 defines a plurality of raised threaded portions 17 that are angularly spaced relative to each other for threadedly engaging a connecting end portion 22 of the arbor 10, and a plurality of recessed unthreaded portions 19 located between the threaded portions.

In a standard hole cutter or saw, on the other hand, the central aperture in the end plate or cap of the hole cutter defines a continuous or substantially continuous thread extending about the circumference of the aperture. Such standard hole cutters conform to the ASME B94.54-1999 standard, and in accordance with such ASME standard, define a standard thread form depending on the outside diameter of the hole saw as follows: For hole saws having outside diameters between 9/16 inch and 1 3/16 inches, the standard thread form is a ½-20 UNF-2B thread, and for hole saws having outside diameters between 1¼ inches and 6 inches, the standard thread form is a 5/8-18 UNF-2B thread. Accordingly, the term "standard" hole cutter is used herein to mean a hole cutter that has such a threaded aperture; whereas the term "quick change" hole cutter is used herein to mean a hole cutter that does not include a such a conventional threaded aperture, but rather includes a connecting aperture defining one or more features to facilitate a quick change attachment of the hole cutter to the arbor, such as the plural raised engagement portions and plural recessed portions located therebetween and described further below.

Figure 4:
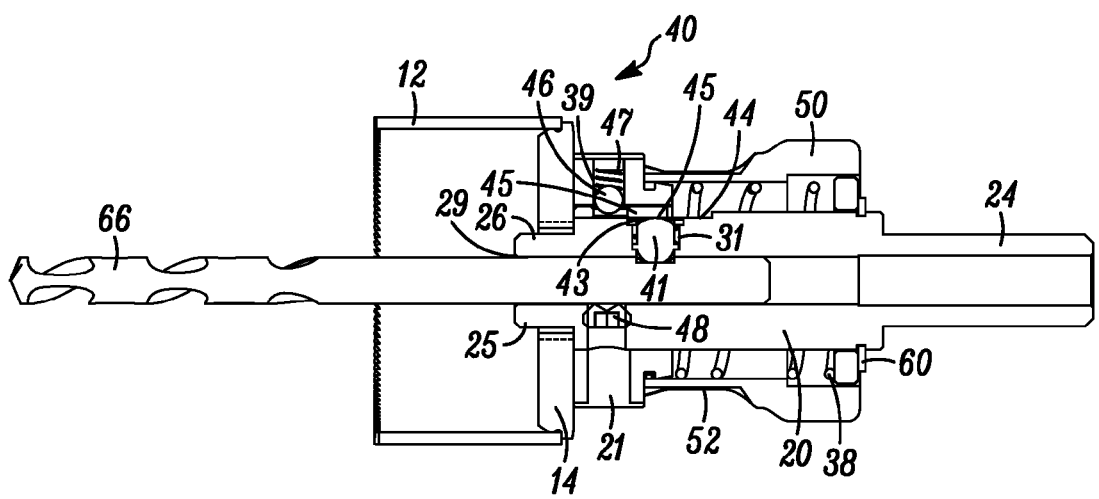
FIG. 4 is a cross-sectional view of the arbor of FIG. 1 further showing the pilot bit mechanism of the arbor in a first or quick change pilot bit state.
Figure 5:
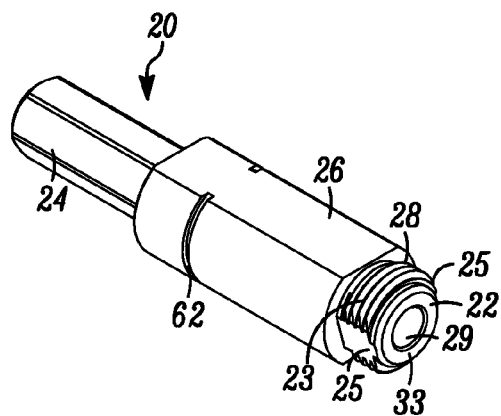
FIG. 5 is a perspective view of the arbor body of the arbor of FIG. 1.
Figure 6:
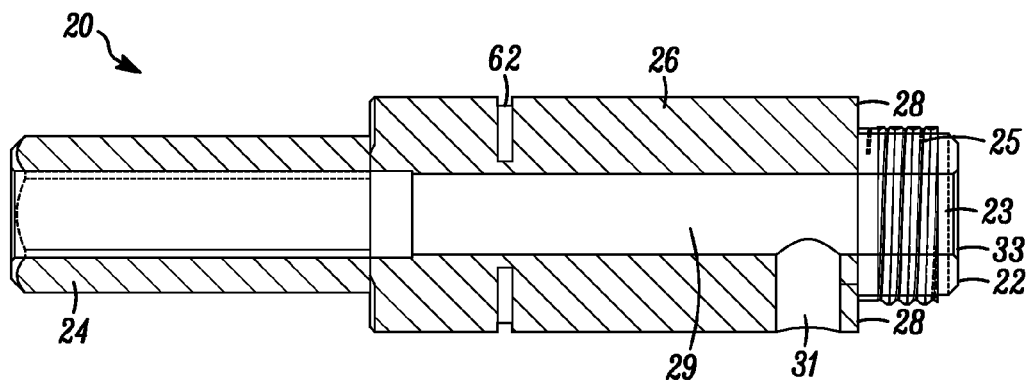
FIG. 6 is a cross-sectional view of the arbor body of FIG. 5.
Figure 7:
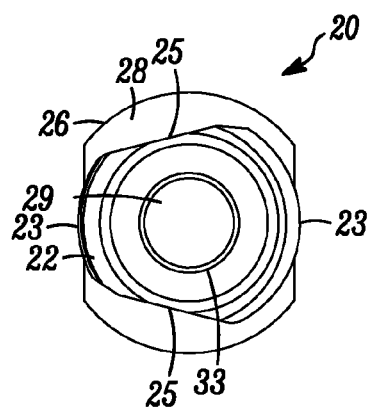
FIG. 7 is a front end view of the arbor body of FIG. 5.
Figures 18, 19:
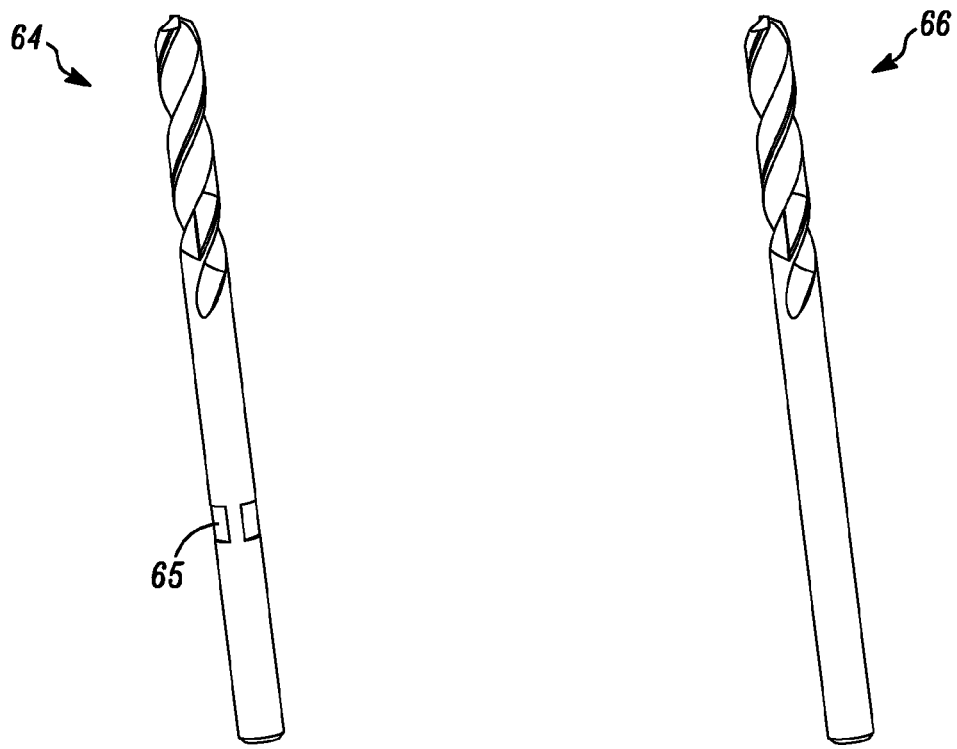
FIG. 18 is a perspective view of a quick change pilot bit.
FIG. 19 is a perspective view of a standard pilot bit.

As shown best in FIGS. 5-7, the arbor 10 comprises an axially-elongated arbor body 20 defining an axially extending pilot bit aperture 29 for receiving a pilot bit, such as a quick change pilot bit 64 (FIG. 18) or a standard pilot bit 66 (FIG. 19). A standard pilot bit is a pilot bit that does not include a feature for allowing attachment of the bit to an arbor without tools. The arbor body 20 includes a body portion 26 defining a stop surface 28, and an end portion 22 that extends axially from the stop surface 28 and defines an end surface 33. As described further below, the end portion 22 is engageable within the hole cutter aperture 16 (FIG. 4) to secure the arbor body to the hole cutter. In the illustrated embodiments, and as described further below, the end portion 22 threadedly engages the hole cutter aperture 16; however, as may be recognized by those of ordinary skill in the pertinent art based on the teachings herein, any of numerous other connection mechanisms or features that are currently known, or that later become known, equally may be employed. As can be seen in FIGS. 5-7, the body portion 26 of the arbor defines a "double D" cross-sectional configuration (i.e., a pair of opposing substantially flat side surfaces with a pair of opposing substantially curvilinear side surfaces extending therebetween); however, as may be recognized by those of ordinary skill in the pertinent art based on the teachings herein, this configuration is only exemplary, and numerous other shapes and/or configurations that are currently known, or that later become known equally may be used. A drive shank 24 is formed on the arbor body 20 opposite the end portion 22. In the illustrated embodiment, the drive shank 24 is a quick-release power drive shank of a type known to those of ordinary skill in the pertinent art. However, as may be recognized by those of ordinary skill in the pertinent art based on the teachings herein, the shank 24 may take the form of any of numerous different types of shanks or other structures that are currently known, or that later become known for performing the function of the shank 24.

Figure 1:
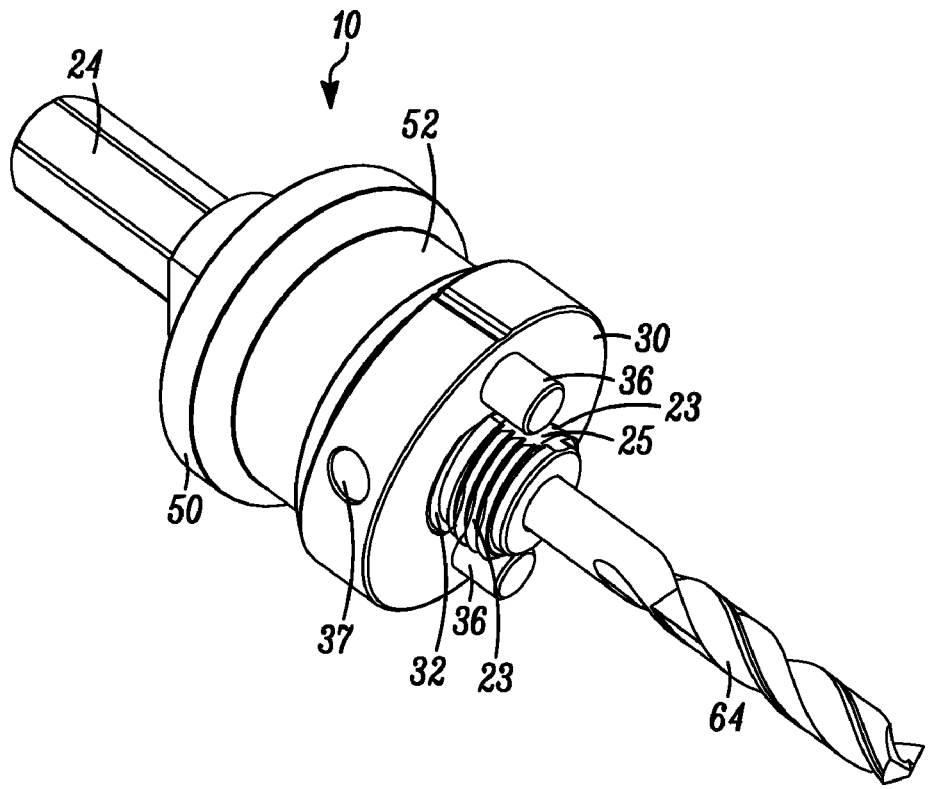
FIG. 1 is a perspective view of an arbor for a hole saw according to an embodiment of the invention.
Figure 2:
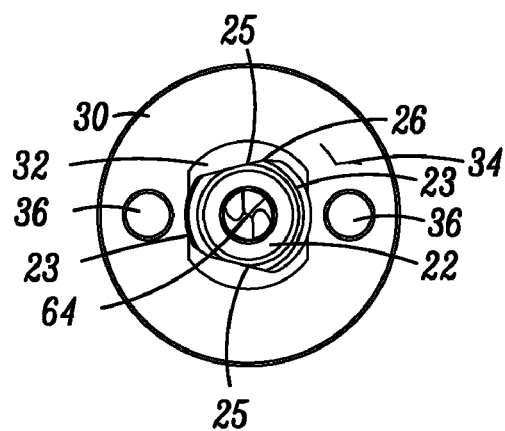
FIG. 2 is a top plan view of the arbor of FIG. 1.
Figure 14A:
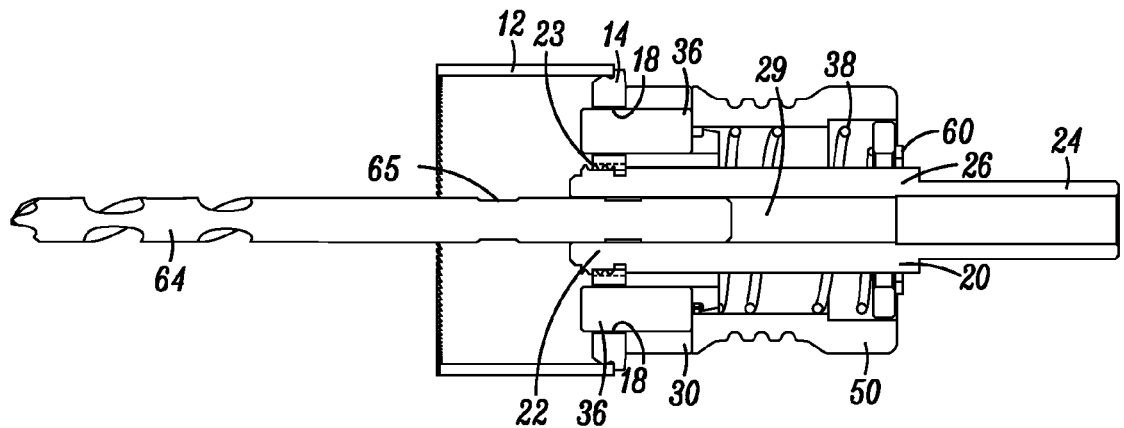
FIGS. 14A and B are cross-sectional views of the arbor of FIG. 13 showing movement of the drive pin plate between the first position (FIG. 14A) and the second position (FIG. 14B) so that the drive pins engage/disengage the corresponding drive pin apertures of the hole saw.
Figure 14B:
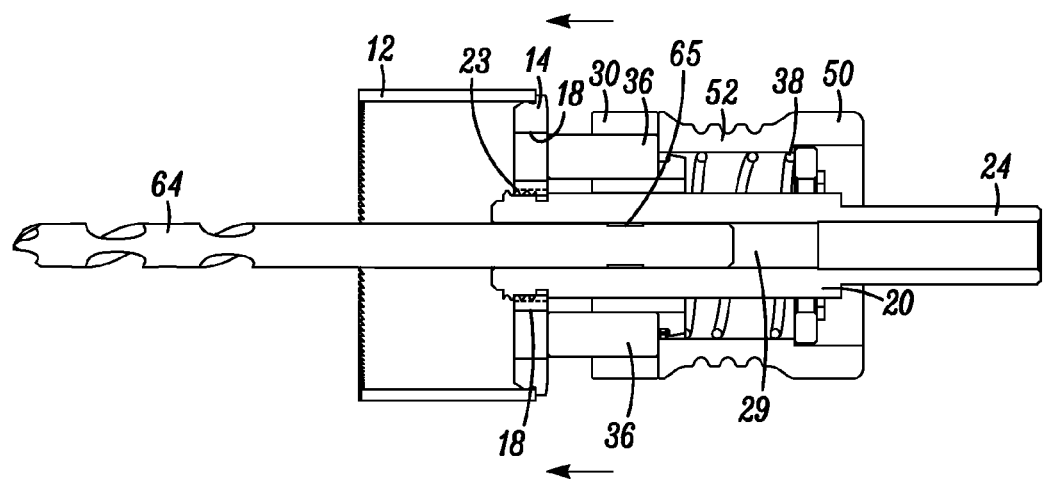

As shown typically in FIGS. 1-4 and 11-12, the arbor 10 further includes a drive pin plate 30 defining an aperture 32 extending therethrough. The aperture 32 is configured for receiving the arbor body 20 and engaging the body portion 26 of the arbor body such that the drive pin plate 30 is prevented from rotating relative to the arbor body, but is allowed to move axially over the arbor body between a first position engaging the hole cutter 12 (FIG. 14A), and a second position disengaged from the hole cutter 12 (FIG. 14B). As best shown in FIG. 2, the aperture 32 defines a "double D" configuration to matingly engage the body portion 26 of the arbor body 20; however, as may be recognized by those of ordinary skill in the pertinent art based on the teachings herein, this configuration is only exemplary, and numerous other shapes and/or configurations that are currently known, or that later become known equally may be used. The drive pin plate 30 further includes a first or hole cutter bearing surface 34, and a plurality of drive pins 36. The drive pins 36 extend axially from the first surface 34, are angularly spaced relative to each other, and are radially spaced relative to the aperture 32. Each drive pin 36 is received within a corresponding drive pin aperture 18 of the hole cutter 12 when the drive pin plate 30 is in a first position engaging the hole cutter (FIGS. 4 and 14A), and is displaced from the respective drive pin aperture 18 when the drive pin plate is in a second position disengaged from the hole cutter (FIG. 14B). In the illustrated embodiment, the drive pin plate 30 includes two diametrically opposed drive pins 36; however, as may be recognized by those of ordinary skill in the pertinent art base on the teachings herein, the drive pin plate 30 can take any of numerous different configurations and can include any number of drive pins 36 that can take any of numerous different configurations that are engageable with corresponding drive pin apertures 18 or other recesses in the hole cutter.

Figure 3:
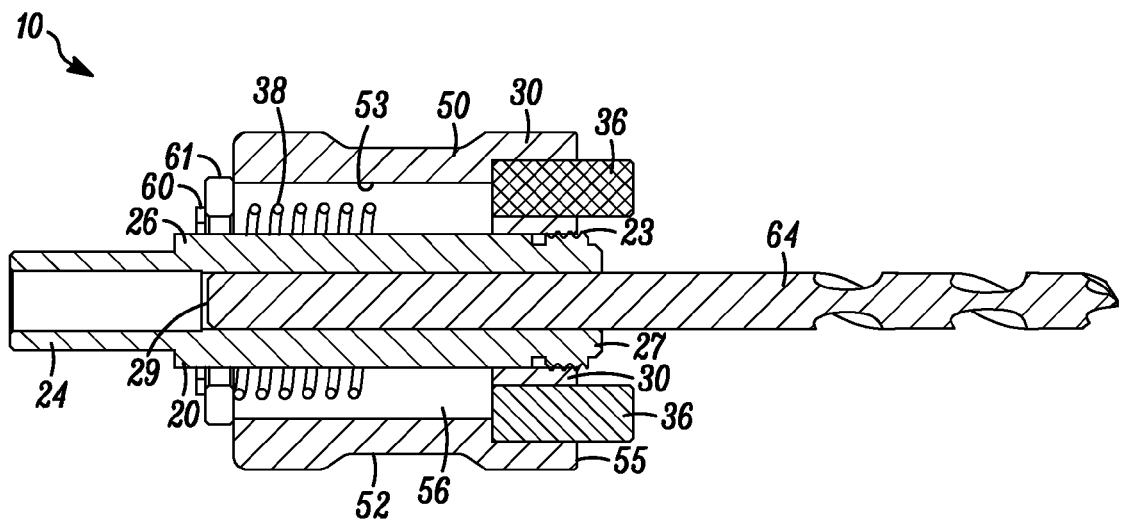
FIG. 3 is a cross-sectional view of the arbor of FIG. 1.

As shown in FIGS. 3 and 4, a biasing member 38 biases the drive pin plate 30 in the direction from the second disengaged position toward the first engaged position. As described in further detail below, the biasing member 38 normally biases the drive pin plate 30 into the first engaged position when the drive pins 36 and corresponding drive pin apertures 18 are placed in alignment, such that the drive pin plate 30 abuts the end plate 14 of the hole cutter 12, and supports the hole cutter in a manner that substantially prevents off-axis wobble and undesirable vibrations during use. One advantage of this feature is that it facilitates one-handed attachment of the hole cutter to the arbor, or otherwise facilitates rapid attachment and detachment of the hole cutter to and from the arbor.

Preferably, the arbor 10 is adapted to receive and mount both quick change hole cutters and standard hole cutters. However, the invention and aspects thereof may be embodied in arbors adapted to mount only quick change hole cutters. In a standard hole cutter (not shown), the threaded aperture in the end plate of the hole cutter (defining, for example, either a ½-20 UNF-2B thread or a ⅝-18 UNF-2B thread, depending on the outer diameter of the hole saw) threadedly engages the end portion 22 of the arbor body 20 to secure the arbor body thereto. In the quick change hole cutter 12, on the other hand, and as shown typically in FIG. 10, the aperture 16 in the end plate 14 defines a plurality of curvilinear protrusions 17 angularly spaced relative to each other along the circumference of the aperture, and a plurality of curvilinear recesses 19 located therebetween. The curvilinear protrusions 17 define female threads that threadedly engage corresponding male threads formed on the end portion 22 of the arbor body 20. More specifically, and as shown in FIGS. 5 and 7, the end portion 22 of the arbor body 20 defines a plurality of angularly extending, curvilinear arbor protrusions 23 that project radially outwardly, and are angularly spaced relative to each other about the circumference of the end portion 22, and a plurality of angularly extending recesses or flats 25 located therebetween. In the illustrated embodiment, one or more of the protrusions 23 on the arbor body 20 and the corresponding protrusions 17 on the hole cutter 12 defines a greater or lesser angular extent than the other protrusions so that the quick change hole cutter can be fitted to the end portion 22 of the arbor body in only one first engagement position, and in that first engagement position, the lead male and female threads can properly engage when moving from the first engagement position to the second engagement position. More specifically, as shown typically in FIG. 7, a first protrusion 17 on the end portion 22 of the arbor body to the left in the drawing defines a greater angular extent than the opposite second protrusion 23 located to the right in the drawing. Similarly, the hole saw cap 14 of FIG. 10 includes a first recess 19 defining a greater angular extent than the opposite second recess 19. Accordingly, in the first engagement position, the first recess 19 receives the first protrusion 23, the second recess 19 receives the second protrusion 23, and this is the only position in which the end portion 23 of the arbor can be received within the central aperture of the hole cutter. In this first engagement position, the lead threads of the respective protrusions of the arbor and hole saw engage upon moving at least one of the hole cutter and arbor body relative to the other between the first and the second engagement positions. Because of the different angular extents of the opposing threaded protrusions of the quick change hole saw cap and arbor body, 17 and 23, respectively, the end portion 22 of the arbor body can be received into the aperture 16 of the hole saw cap in only one position, and in that position, the lead male and female threads can engage upon moving the hole cutter and/or arbor body relative to the other between the first and second engagement positions. If desired, or alternatively, the hole cutter and/or arbor can include visual markings thereon that can be aligned or otherwise used to orient the position of the hole cutter aperture relative to the connecting portion of the arbor in order to ensure attachment of the hole to the arbor in the first engagement position.

Figure 11:
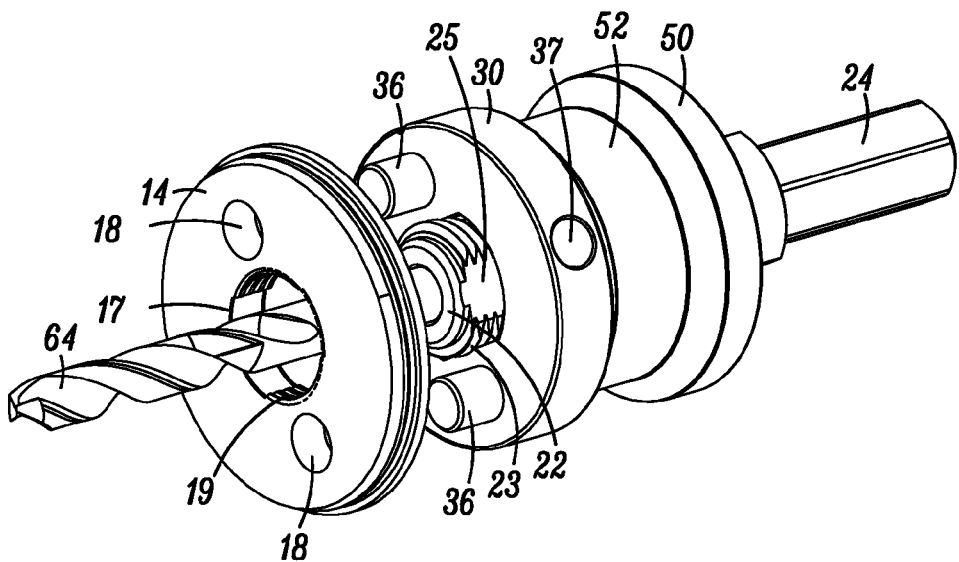
FIG. 11 is a perspective view of the arbor of FIG. 1 showing the step of aligning the hole saw aperture with the end portion of the arbor body and with parts of the hole saw removed for clarity.
Figure 12:
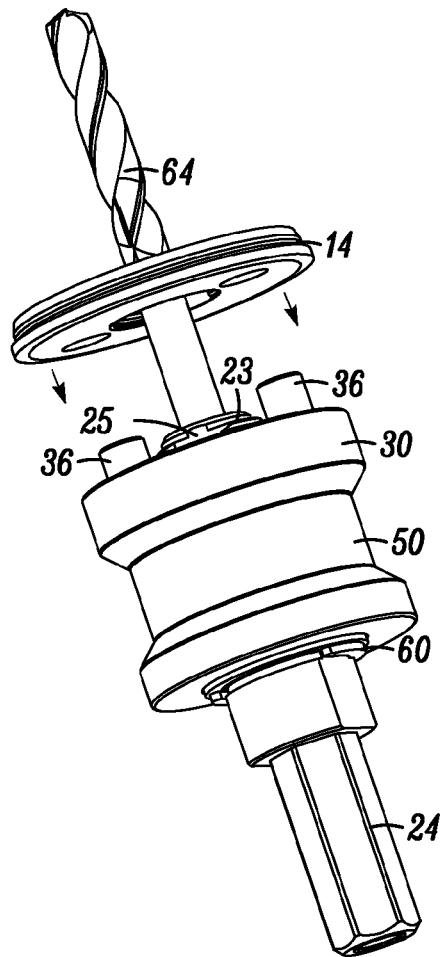
FIG. 12 is a perspective view of the arbor of FIG. 11 showing the step of moving the aligned hole saw aperture into engagement with the end portion of the arbor body.
Figure 13:
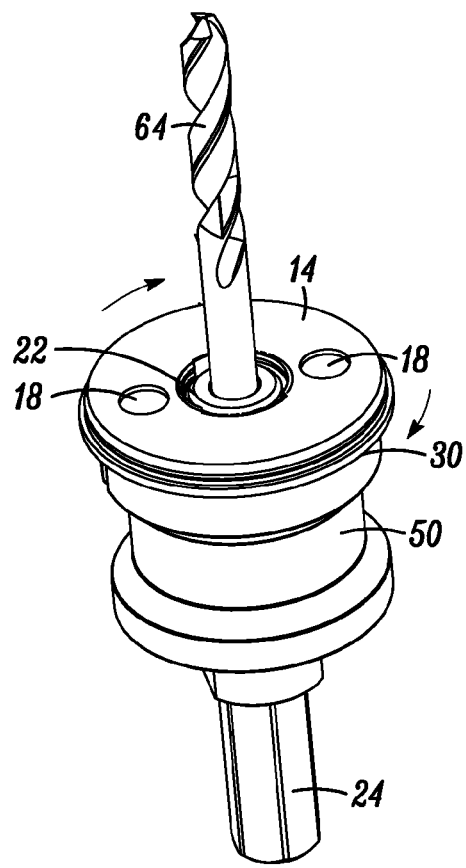
FIG. 13 is a perspective view of the arbor of FIG. 12 showing the step of rotating the hole saw to fully engage the end portion of the arbor.

As shown in FIGS. 11-13, in order to attach the hole cutter 12 to the arbor body 20, the protrusions 23 on the end portion 22 of the arbor body 20 are aligned with the correspondingly-sized recesses 19 of the hole cutter aperture 16. Then, the hole cutter 12 is slipped over the end portion 22 of the arbor body 20 (or vice versa) until the end plate 14 of the hole cutter is adjacent to, substantially in contact with, or in contact with the shoulder 28 of the arbor body 20 to thereby place the hole cutter and arbor body in the first engagement position. As indicated above, in this position, the lead male threads of the arbor body and lead female threads of the hole cutter can engage upon rotating at least one relative to the other. Then, the hole cutter 12 is rotated relative to the arbor body 20 from the first engagement position to a second engagement position (or the arbor body is rotated relative to the hole cutter, or both the hole cutter and arbor body are rotated in opposite directions) to, in turn, threadedly engage the male threaded protrusions 23 of the end portion 22 of the arbor body with the corresponding female threaded protrusions 17 of the hole cutter, and thereby fixedly secure the hole cutter to the arbor body.

In the illustrated embodiment, the male threads of the arbor body protrusions 23 and the female threads of the hole cutter protrusions 17 are configured (or "clocked") so that when the hole cutter and/or arbor body is rotated from the first engagement position to the second engagement position, the drive pins 36 of the arbor and drive pin apertures 18 of the hole cutter are substantially aligned in the second engagement position to, in turn, allow the drive pins to be axially received within the drive pin apertures and thereby further secure the hole cutter to the arbor. In addition, the male and female threads of the protrusions 23 and 17, respectively, are preferably configured so that when the hole cutter 12 and/or the arbor body 20 are rotated into the second engagement position, the end plate 14 is in contact with, or substantially in contact with the shoulder 28 of the arbor body to, in turn, allow the shoulder to engage and further support the hole cutter during use. In the illustrated embodiments of the present invention, there is sufficient axial clearance between the male and female threads of the protrusions 23 and 17, respectively, to allow the end plate 14 of the hole cutter to contact or substantially contact the shoulder 28 of the arbor body in the first engagement position, and to allow the end plate 14 of the hole cutter to remain in contact or substantial contact with the shoulder 28 during rotation between the first and second engagement positions, so that in the second engagement position, the end plate 14 is in contact with, or in substantial contact with the shoulder 28 of the arbor body. During rotation between the first and second engagement positions, the threads tend to drive the hole cutter 12 axially inwardly toward the shoulder 28 (or vice versa) and thus substantially eliminate or eliminate the axial clearance between threads in the second engagement position.

As indicated above, one advantage of the currently preferred embodiments of the present invention is that the threaded end portion 22 of the arbor is threadedly engageable with either quick change hole cutters or standard hole cutters. The combination of threaded protrusions 23 on the end portion 22 of the arbor body 20 forms an interrupted, but continuous thread pattern for engaging the female threads on a standard hole cutter as defined above (e.g., either a ½-20 UNF-2B thread or a ⅝-18 UNF-2B thread, depending on the outer diameter of the hole saw). Thus, in order to attach a standard hole cutter to the arbor body, the threaded aperture in the standard hole cutter cap is fitted over the threaded end portion 22 of the arbor body, and at least one of the hole cutter and arbor body is rotated relative to the other to engage the threads. Then, the hole cutter and/or arbor is rotated relative to the other to further engage the threads and, in turn, axially move the end cap of the hole cutter into engagement with the shoulder 28 of the arbor body (FIG. 7). In this position, if the drive pins 36 are aligned with the drive pin apertures of the standard hole cutter, then the drive pin plate is moved downwardly, or allowed to move downwardly into engagement with the end plate on the hole cutter to, in turn, receive the drive pins within the drive pin apertures. If the drive pins and drive pin apertures are not aligned in this position, then the hole saw is rotated and backed away slightly from the shoulder 28 of the arbor until the drive pin apertures and drive pins are aligned. When so aligned, the drive pin plate is moved downwardly, or allowed to move downwardly into engagement with the drive pin apertures to complete the connection of the hole cutter to the arbor.

In the currently preferred embodiments of the present invention, the relative rotation of the hole cutter 12 and/or arbor 10 between the first and second engagement positions is within the range of about 10 degrees and about 180 degrees, is preferably within the range of about 30 degrees and about 120 degrees, and is most preferably within the range of about 40 degrees and about 100 degrees. In the illustrated embodiment, the relative rotation between the first and second engagement positions is about 45 degrees. However, as may be recognized by those of ordinary skill in the pertinent art based on the teachings herein, these angular ranges and angles are only exemplary, and numerous other angles and/or angular ranges equally may be employed.

Figure 28:
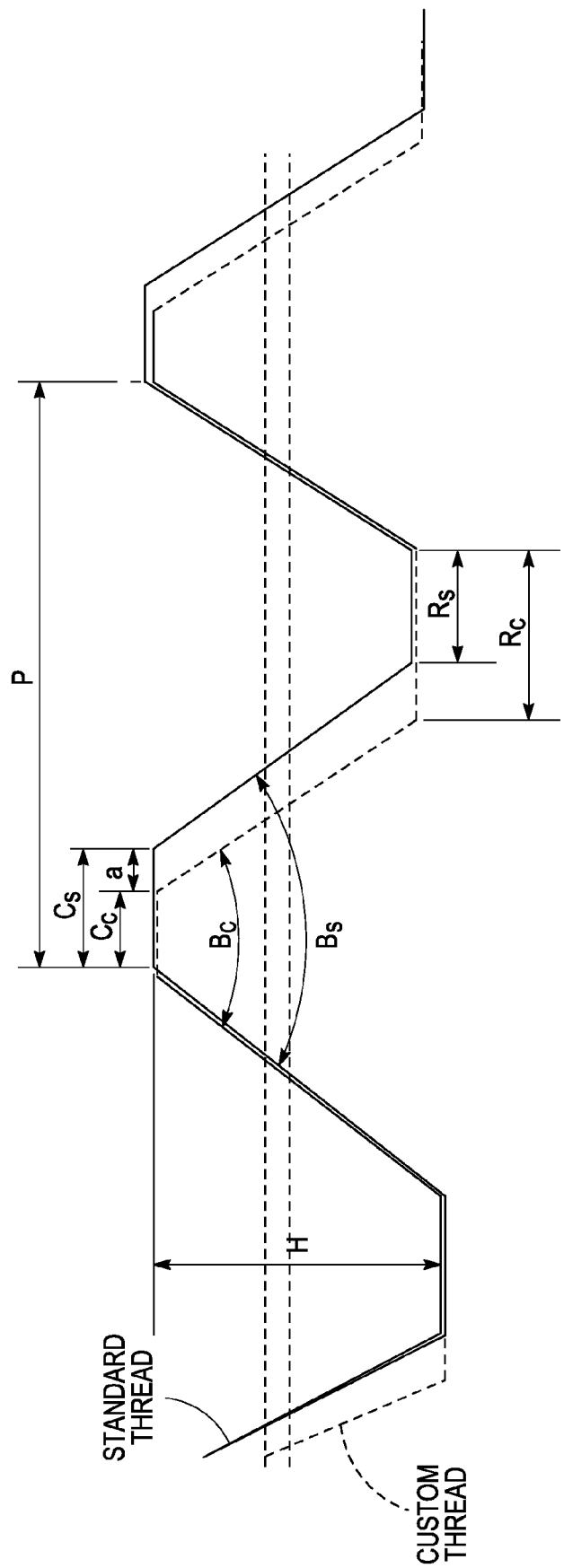
FIG. 28 is a somewhat schematic illustration of standard hole cutter thread form shown in solid lines, and a custom hole cutter thread form in accordance with the currently preferred embodiments of the present invention shown in broken lines.

As shown typically in FIG. 28, the arbors and hole cutters of the currently preferred embodiments of the present invention define custom thread forms that allow the end portions of the arbors to be threadedly engaged to both quick change hole cutters and standard hole cutters; that allow the quick change hole cutters to engage or substantially engage the shoulder of the arbor in both the first and second engagement positions; and that are timed so that in the second engagement position the drive pins of the arbor are aligned or substantially aligned with the drive pin recesses of the hole cutter. As indicated above, standard hole cutters having hole saw diameters of 1 3/16 inches or less define a ½-20 UNF-2B thread ("small diameter" hole cutters), and standard hole cutters having hole saw diameters of 1 ¼ inches or greater define a ⅝-18 UNF-2B thread ("large diameter" hole cutters). Accordingly, the custom thread forms of the currently preferred embodiments of the present invention are based on these standard thread forms to allow attachment of the arbor to hole cutters with such standard threads; however, the custom thread forms also vary from the standard thread forms in order to allow attachment of quick change hole cutters as described. The currently preferred embodiments of the present invention define a "½-20 custom thread" for relatively small diameter hole cutters, and a "⅝-18 custom thread" for relatively large diameter hole cutters. Each custom thread defines the same thread height "H", pitch "P", and included angle "P", as the respective standard thread form, but defines a different axial clearance "a", root "R", and crest "C". In the illustrated embodiments, the customer thread forms differ from the standard thread forms as follows:

TABLE 1

| Different Features | Standard Thread Forms | Custom Thread Forms |
|---|---|---|
| Root ("R") | 0.25 P | 0.25 P + a |
| Crest ("C") | 0.125 P | 0.125 P − a |
| Axial Clearance | Not Specified, But Negligible or Approximately Zero | a |

The minimum clearance "a" for each custom thread form is preferably determined in accordance with the following formula: a=((1/pitch)/360))*D, where D) equals the degree of rotation between the first and second engagement positions. For example, as indicated in the table below, if the hole cutter includes two threaded protrusions 17 (or "lobes"), it will rotate 90° between the first and second engagement positions; if the hole cutter includes 3 lobes, it will rotate 60° between the first and second engagement positions; if the hole cutter includes 4 lobes, it will rotate 45° between the first and second engagement positions, etc. The minimum axial clearance "a" is set to time the threads so that in the second engagement position the drive pins are aligned or substantially aligned with the respective drive pin recesses in the hole cutter to allow the drive pins to be moved into the engaged position. The following table lists exemplary minimum approximate clearances "a" for the ⅝-18 and ½-20 custom thread forms:

TABLE 2

| Number of Lobes (or curvilinear threaded protrusions) | Angular Rotation Between First And Second Engagement Positions | Minimum Approximate Clearance "a" for ⅝-18 Custom Thread Form (inches) | Minimum Approximate Clearance "a" for ½-20 Custom Thread Form (inches) |
|---|---|---|---|
| 2 lobe (square/rectangle) | 90° | 0.014 | 0.012 |
| 3 lobe (triangle) | 60° | 0.009 | 0.008 |
| 4 lobe (cross) | 45° | 0.007 | 0.006 |
| 5 lobe (pent) | 36° | 0.006 | 0.005 |
| 6 lobe (hex) | 30° | 0.005 | 0.004 |

As may be recognized by those of ordinary skill in the pertinent art based on the teachings herein, these minimum clearances are only exemplary, and numerous other clearances equally may be employed. Preferably, the minimum clearance "a" is approximately as defined above; however, if desired, the clearance may be greater than the minimum as defined above. In some embodiments of the present invention, the clearance is within the range of about 1 to about 1½a. If, for example, the clearance is greater than the respective minimum clearance "a", the drive pins will be allowed to move into the drive pins recesses when the hole cutter is located in the second engagement position. If, on the other hand, the clearance is too small such that the hole cutter cannot move into the second engagement position and thus cannot move the drive pin recesses into alignment with the drive pins, the hole cutter cannot be properly attached to the arbor.

Figure 16:
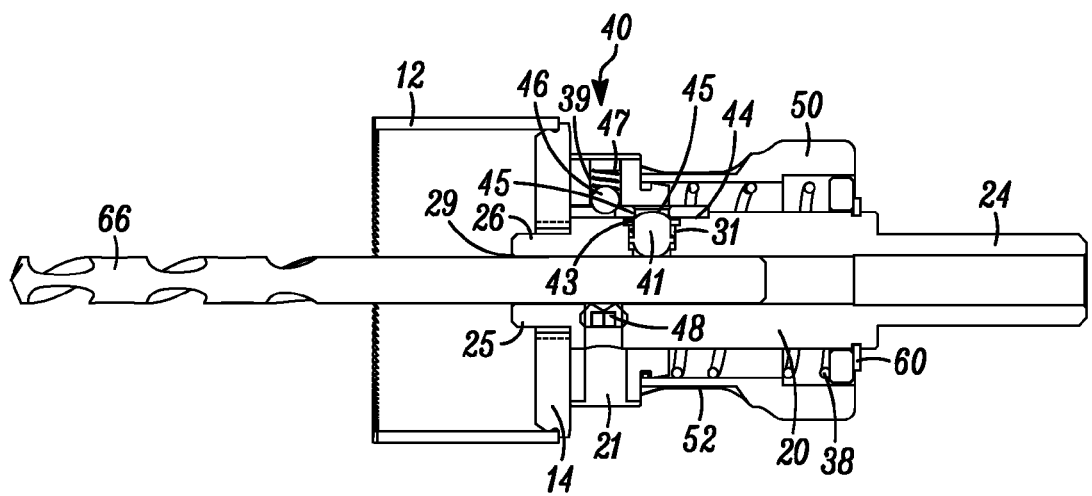
FIG. 16 is a cross-sectional view of the arbor of FIG. 1 showing the pilot bit mechanism in a second or standard pilot bit state.
Figure 17:
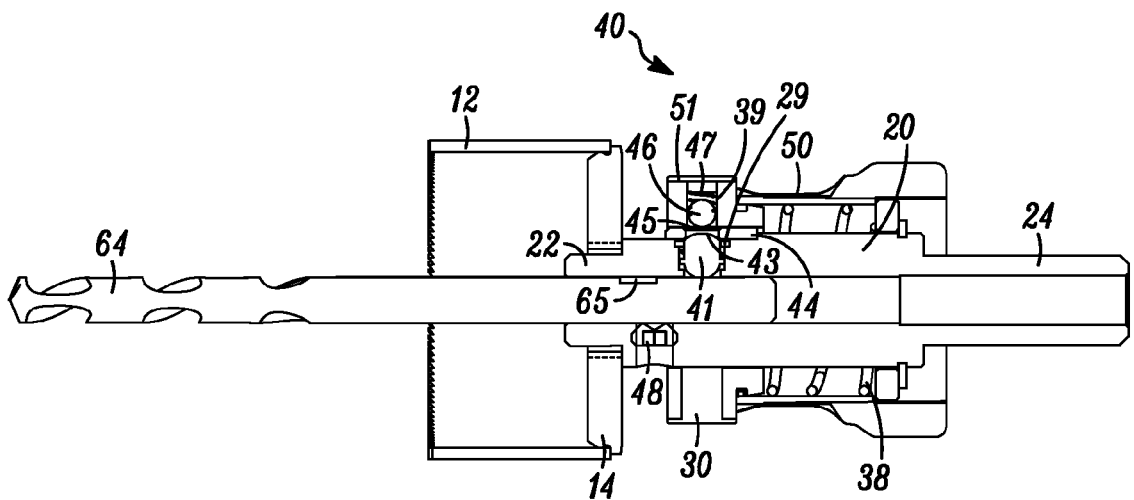
FIG. 17 is a cross-sectional view of the arbor of FIG. 1 showing the pilot bit mechanism in a third or neutral state disengaged from the pilot bit inserted therein.

As shown best in FIGS. 4 and 16-17, the arbor 10 further includes a pilot bit mechanism 40, at least a portion of which is housed in the arbor body 20 and/or a housing in the drive pin plate 30. The pilot bit mechanism 40 is designed to allow substantially automatic and/or manual engagement and disengagement of both quick change and standard pilot drill bits (FIGS. 18-19). In the illustrated embodiment, the pilot bit mechanism 40 defines a quick change pilot bit state, shown in FIG. 4, a standard pilot bit state, shown in FIG. 16, and a neutral state shown in FIG. 17. In the quick change pilot bit state shown in FIG. 4, the pilot bit mechanism 40 engages a quick change pilot bit 64 to prevent movement of, and otherwise releasably secure the bit to the arbor body 20; in the standard pilot bit state shown in FIG. 16, the pilot bit mechanism 40 engages a standard pilot bit 66 to prevent movement of, and otherwise releasably secure the bit to the arbor body 20; and in the neutral state shown in FIG. 17, the pilot bit mechanism 40 is disengaged from the respective quick change pilot bit 64 or standard pilot bit 66 (whichever one is inserted in the pilot bit aperture 29) to release, remove and/or replace the bit. As described further below, the pilot bit mechanism 40 may include a visual indicator that alerts a user when a standard pilot bit 66 is inserted in the pilot bit aperture 29.

Figure 8:
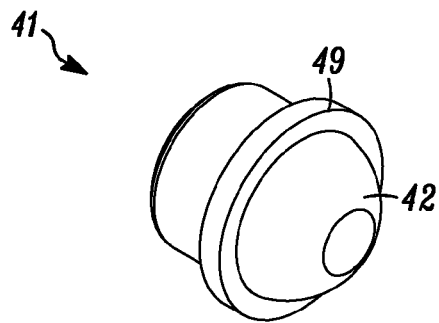
FIG. 8 is a perspective view of the pilot pin of the arbor of FIG. 1.
Figure 9:
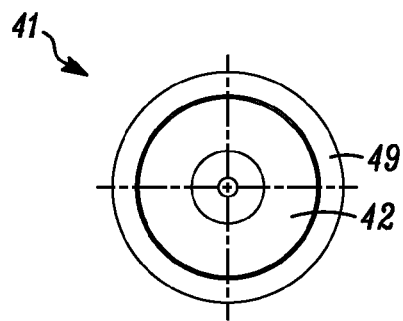
FIG. 9 is a top plan view of the pilot pin of FIG. 8.

As shown in FIGS. 4 and 16-17, the pilot bit mechanism 40 comprises a pilot pin 41 (shown separately in FIGS. 8-9) movable between a first position and a second position. The first position corresponds with the quick change pilot bit state wherein the pilot pin engages the quick change bit 64 (FIG. 4). The second position corresponds with either the standard pilot bit or neutral states wherein the pilot pin is either disengaged from the quick change bit, as shown in FIG. 17, or positioned to allow a standard bit 66 to be inserted into the arbor body 20, as shown in FIG. 16. As shown in FIG. 18, the quick change pilot bit 64 includes a shank defining at least one pilot pin engaging feature 65 such as, for example, a groove, recess, aperture, notch, indentation, external boss or protrusion. In the illustrated embodiment, the quick change bit 64 has a rectangular notch for engaging the pilot pin 41; however, as may be recognized by those of ordinary skill in the pertinent art based on the teachings herein, the quick change shank may take the form of any of numerous different types of shapes, and may include any of numerous different configurations or features that are currently known or that later become known for engaging the pilot pin. As shown best in FIG. 8, in order to universally engage the various types of quick change pilot bit shanks that are available, the pilot pin 41 has a substantially rounded tip 42. As shown in FIGS. 4 and 16-17, the pilot bit mechanism 40 includes a biasing member 43, such as a coil spring, that biases the pilot pin 42 into the first position in engagement with a pilot bit received within the pilot bit aperture 29.

As also shown in FIGS. 4 and 16-17, the pilot bit mechanism 40 further comprises a fastener 48 movable between a first position (FIG. 4) disengaged from a pilot bit received within the pilot bit aperture 29, and a second position engaged with either a quick change 64 or standard pilot bit 66 received within the pilot bit aperture 29. In the illustrated embodiment, the fastener 48 is a set screw; however, as may be recognized by those of ordinary skill in the pertinent art based on the teachings herein, the fastener may take the form of any of numerous other types of fasteners that are currently known, or that later become known for releasable securing the inserted pilot bit.

The pilot bit mechanism 40 further comprises a shear pin or ball 46 that is disposed at least partially within a ball receiving aperture 39 defined in the drive pin plate 30. The ball 46 is movable between a first position, wherein the ball 46 outwardly protrudes from the ball receiving aperture 39 when the pilot bit mechanism 40 is in the quick change pilot bit or standard pilot bit states, as shown in FIGS. 4 and 16, and a second position, wherein the ball 46 is substantially retained within the ball receiving aperture 39 when the pilot bit mechanism 40 is in the neutral state, as shown in FIG. 17. A biasing member 47 biases the ball 46 into the first position. In the illustrated embodiment, biasing members 38, 43 and 47 are coil springs; however, as may be recognized by those of ordinary skill in the pertinent art based on the teachings herein, the biasing members may take the form of any of numerous different types of biasing members that are currently known, or that later become known, such as any of numerous different types of springs or other components.

As also shown in FIGS. 4 and 16-17, the pilot bit mechanism 40 further comprises a shear plate 44 defining an aperture 45 for receiving therein the pilot pin 41 and/or ball 46 depending on the state of the pilot bit mechanism. The shear plate 44 is movable between a first position corresponding to the quick change pilot bit state shown in FIG. 4, and a second position corresponding to the standard pilot bit and neutral states of the pilot bit mechanism 40 shown in FIGS. 16-17.

The interaction between the shear pin 41, shear plate 44, ball 46, drive pin plate 30 and pilot bit (quick change bit 64 or standard bit 66) define the three states of the pilot bit mechanism. Other components of the arbor 10 may also play a role in defining the states the pilot bit mechanism; however, attention will be focused on the above-mentioned components. Referring to FIG. 17, the neutral state of the pilot bit mechanism 40 is shown. From the neutral state, the pilot bit mechanism 40 can move into either the quick change pilot bit state (FIG. 4) or the standard pilot bit state (FIG. 16) depending on the type of pilot bit being used (i.e. quick change bit 64 or standard bit 66). As noted above, the pilot bit mechanism 40 is disengaged from the pilot bit while in the neutral state, which allows for the removal or insertion of any type of pilot bit. In the neutral state, the drive pin plate 30 is in its respective second or disengaged position (FIGS. 14B and 17). In this position, the pilot pin aperture 31, the shear plate aperture 45 and the ball receiving aperture 39 are substantially aligned, allowing the pilot pin 41 and ball 46 to move freely between their respective first and second positions depending on the type of pilot bit inserted into the pilot bit aperture 29.

If a quick change pilot bit 64 is inserted into the pilot bit aperture 29, and with the drive pin plate 30 in its second or disengaged position (FIG. 17), the pilot bit mechanism 40 is positioned to transform from the neutral state to the quick change pilot bit state to engage the quick change pilot bit 64. In the quick change pilot bit state, shown in FIG. 4, the pilot pin 41 is biased inwardly by its associated biasing member 43 into the recess 65 of the quick change pilot bit 64 to secure the bit 64; accordingly, the ball 46 is biased inwardly by its associated biasing member 47 into the shear plate aperture 45, so that the ball 46 engages the shear plate 44. With the ball 46 engaging the shear plate 44, the position of the shear plate 44 is fixed relative to the drive pin plate 30 so that any movement of the drive pin plate 30 between its first and second positions causes the shear plate 44 to move between its first and second positions. To enter the quick change pilot bit state from the neutral state, the drive pin plate 30 must be moved from its second position (FIGS. 14B and 17) to its first position (FIGS. 4 and 14A), which, in turn, causes the shear plate 44 to move from its second position (FIG. 17) to its first position (FIG. 4). Once in its first position, the shear plate 44 prevents outward movement of the pilot pin 41 to thereby releasably lock the pilot pin 41 in engagement with the quick change pilot bit 64 and secure the bit in the pilot bit aperture 29.

If a standard pilot bit 66 is inserted into the pilot bit aperture 29, and with the drive pin plate 30 in its second position (FIG. 17), the pilot bit mechanism 40 is positioned to transform from the neutral state to the standard pilot bit state to engage the standard pilot bit 66. In the standard pilot bit state, shown in FIG. 16, the standard pilot bit 66 having been inserted into pilot bit aperture 29 maintains the pilot pin 41 in its second position so that a portion of the pilot pin 41 is seated within the shear plate aperture 45. In this position, the pilot pin 41 engages the shear plate 44 so that the axial position of the shear plate 44 is fixed relative to the arbor body 20. To enter the standard pilot bit state from the neutral state, the drive pin plate 30 must be moved from its second position (FIGS. 14B and 17) to its first position (FIGS. 14A and 16). However, in contrast to the quick change pilot bit state, the shear plate 44 will not move from its second position to its first position when the drive pin plate 30 is moved; instead, the shear plate 44 will remain in its second position as a result of being engaged by the pilot pin 41. In the standard pilot bit state, the ball 46 is biased into contact with the outer surface of the shear plate 44 further preventing the shear plate 44 from moving out of its second position. To fully secure the standard pilot bit 66, the fastener 48 is moved into engagement with the pilot bit 66 to secure the bit within the bit aperture 29, which in turn, maintains the pilot pin 41, shear plate 44 and ball 46 in their respective positions associated with the standard pilot bit state (FIG. 16) as described above. In one embodiment, in the standard pilot bit state, an end of the shear plate 44 protrudes visibly outwardly to provide a visual indication that a standard pilot bit is being used, and thus functions as visual alert to the user to manually engage the fastener 48 and, in turn, fixedly secure the standard pilot bit.

As shown typically in FIGS. 1 and 3, the arbor 10 further comprises a spacer collar 50. The spacer collar 50 defines a peripheral, axially-extending side wall 52, a bore 53 formed on the inner side of the side wall 52, and an expanded recess 55 formed on the inner end of the bore for receiving therein the drive pin plate 30 that is fixedly secured thereto. The inner bore 53 of the collar 50 and the body portion 26 of the arbor body 20 define an annular, axially-extending compartment 56 for receiving and supporting therein the first biasing member 38 which, in the illustrated embodiment, is a coil spring. As shown best in FIGS. 3 and 12, the arbor 10 includes a retaining clip or ring 60 connectable to a groove 62 formed in the body portion 26 of the arbor body 20, a bushing 61 that engages on its end surface the clip 60, and slidably engages on its outer surface the bore 53 of the collar 50 to guide the axial movement of the collar and drive pin plate between the first engaged (FIGS. 4 and 14A) and second disengaged (FIG. 14B) positions. As can be seen, the first biasing member 38 is axially fitted between the bushing 60 and the inner end of the drive pin plate 30 to normally bias the drive pin plate outwardly into the first engaged position. As described further below, a user can manually engage the collar 50 to retract the collar against the bias of the first biasing member 38 into the disengaged position and can, in turn, release the collar to allow the first biasing member to drive the collar and drive pin plate from the disengaged to an engaged position. Alternatively, for one-handed attachment, a user can press the hole cutter cap 14 against the drive pin plate 30 to, in turn, correspondingly compress the coil spring 38 and place the hole cutter against the shoulder 28 of the arbor in the first engagement position. Then, upon rotating the hole cutter with the same hand from the first engagement position into the second engagement position, the coil spring automatically drives the drive pin plate 30 into the engaged position with the drive pins 36 received within the drive pin apertures of the hole cutter to complete attachment of the hole cutter to the arbor.

Figure 15:
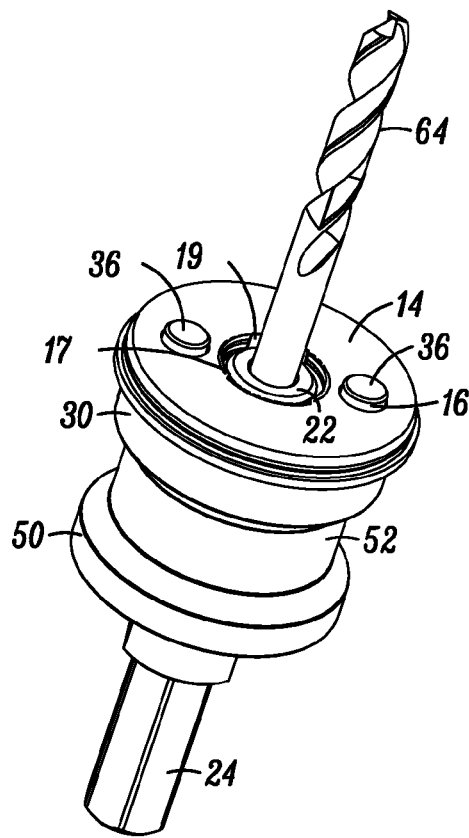
FIG. 15 is a perspective view of the arbor of FIG. 13 showing the drive pin plate engaged with the hole saw cap.

Having thus described the arbor 10 and its components, attention will now be drawn to a method of attaching and removing hole cutters and pilot drill bits to and from the arbor, respectively. With the drive shank 24 of the arbor 10 inserted and engaged by the chuck of a driving tool, such as a drill (not shown) or, prior to insertion and engagement with the tool, the end user aligns the hole cutter aperture 16 with the end portion 22 of the arbor. If a quick change hole cutter is used, the hole cutter recesses 19 are aligned with the arbor body protrusions 23 as shown, for example, in FIG. 11. Once in alignment, the hole cutter is fitted onto the end portion 22 of the arbor body 20 such that the arbor body protrusions 23 are received within the corresponding hole cutter recesses 19, and the base of the hole cutter 14 rests on or about the stop surface 28. During this step, the user substantially simultaneously moves the drive pin plate 30 from the first position to the second position and compresses the first biasing member 28 as shown, for example, in FIG. 12. Referring to FIG. 13, the hole cutter is then rotated from the first engagement position to the second engagement position such that the hole cutter protrusions 17 threadedly engage the respective arbor body protrusions 23 and, in turn, releasably secure the hole cutter to the arbor body. When the hole cutter and arbor body are in the second engagement position, the drive pin apertures 18 of the hole cutter are substantially aligned with the respective drive pins 36 of the drive pin plate 30, thereby allowing the first biasing member 38 to automatically drive the drive pin plate from the second position (FIG. 14B) to the first position (FIG. 14A) and, in turn, drive the drive pins 36 into the corresponding drive pin apertures 18 as shown, for example, in FIG. 15. With the drive pins 36 fully received into the corresponding drive pin apertures 18, the hole cutter 12 is fully engaged and attached to the arbor as shown, for example, in FIG. 4.

If a standard hole cutter (not shown) is used, the end user aligns the hole cutter aperture with the end portion 22 of the arbor body 20 fitting the hole cutter thereupon, such that the hole cutter aperture threadedly engages the threads on the arbor protrusions 23. Like the quick change hole cutter, the standard hole cutter is then rotated to threadedly attach the hole cutter to the end portion of the arbor and receive the drive pins into the corresponding drive pin apertures of the hole cutter. Depending on the threads, the standard hole cutter may not engage or may not fully engage the shoulder or stop surface of the arbor when attached to the arbor; however, since the drive pins drive the hole cutter it is not always necessary that the hole cutter cap engage the stop surface of the arbor.

To attach a quick change pilot bit 64, the drive pin plate 30 is moved from the first position engaging the hole cutter 12 to the second position disengaged from the hole cutter 12 by at least one of: (i) grasping and physically moving the drive pin plate 30, and (ii) pressing downward on the drive pin plate 30 through engagement with the hole cutter 12 during the step of fitting the hole cutter onto the end portion of the arbor body (FIG. 12). The quick change pilot bit 64 is then inserted into the pilot bit aperture 29. As the pilot bit 64 is being inserted, the pilot pin 41 moves from the first position to the second position, wherein the pilot pin 41 slides into the pilot pin aperture 31 formed in the arbor body 20 and at least a portion of the pilot pin 41 enters the shear plate aperture 45 (see, for example, FIG. 17). This allows the pilot pin 41 to exit the pilot bit aperture 29, thereby enabling full insertion of the pilot bit 64. Substantially simultaneously, the ball or pin 46 moves from the first position to the second position. In the second position, the ball 46 at least partially exits the shear plate aperture 45 and at least partially enters the ball receiving aperture 39 formed in the drive pin plate 30.

Once the quick change pilot bit 64 is substantially fully inserted into the pilot bit aperture 29, and the pilot pin 41 is in alignment with the quick change feature 65 of the pilot bit 64, the biasing member 43 returns the pilot pin 41 to the first position such that the pilot pin 41 engages the respective quick change feature 65 of the bit 64 and prevents movement of the quick change pilot bit 64 relative to the arbor body. With the pilot pin 41 engaging the quick change pilot bit 64, the biasing member 47 returns the ball 46 to the first position. In the first position, a portion of the ball 46 is received by the shear plate aperture 45 and engages the shear plate 44, while a portion of the ball remains in the shear pin aperture 31 of the arbor body 20. To fully secure the pilot bit 64, the drive pin plate 30 is then moved from the second position to the first position engaging the hole cutter by at least one of: (i) releasing the drive pin plate 30, and (ii) during the step of rotating the hole cutter, allowing the drive pin plate 30 to move when the drive pin apertures 18 align with the corresponding drive pins 36. As the drive pin plate 30 moves, the shear plate 44 substantially simultaneously moves from the second position to the first position. In the first position, the shear plate 44 locks the pilot pin 41 into engagement with the quick change pilot bit 64, and thereby prevents the pilot bit from moving out of the first position as shown, for example, in FIG. 4.

To attach a standard pilot bit 65, as with a quick change pilot bit, the drive pin plate 30 is moved from the first position engaging the hole cutter to the second position disengaged from the hole cutter by at least one of: (i) grasping and physically moving the drive pin plate 30, and (ii) pressing downward on the drive pin plate 30 through engagement with the hole cutter 12 during the step of fitting the hole cutter onto the end portion of the arbor body (FIG. 12). The standard pilot bit 66 is then inserted into the pilot bit aperture 29. As the pilot bit 66 is inserted, the pilot pin 41 moves from the first position to the second position. In the second position, the pilot pin 41 slides into the pilot pin aperture 31 in the arbor body 20 and at least a portion of the pilot pin 41 enters the shear plate aperture 45 and engages the shear plate 44 (see FIG. 16), thereby allowing the pilot pin 41 to exit the pilot pin aperture 29 and enabling full insertion of the standard pilot bit 66. Substantially simultaneously, the ball 46 moves from the first position to the second position. In the second position, the ball 46 exits the shear plate aperture 45 and enters the ball receiving aperture 39 in the drive pin plate 30.

Once the standard pilot bit 66 is substantially fully inserted into the pilot bit aperture 29, the drive pin plate 30 is then moved from the second position to the first position engaging the hole cutter by at least one of: (i) releasing the drive pin plate 30, and (ii) during the step of rotating the hole cutter, causing the drive pin plate 30 to move when the drive pin apertures 18 align with the corresponding drive pins 36. As the drive pin plate 30 moves, the shear plate 44 remains in the second position due to engagement with the pilot pin 41, which in turn, causes the ball 46 to partially extend outwardly from the ball receiving aperture 47 and into engagement with the shear plate 44 to further maintain the shear plate 44 in the second position. In one embodiment (not shown), the shear plate 44 visually protrudes from behind the drive pin plate 30 to alert the user to use the fastener 48 to engage the standard pilot pit 66, which occurs when the drive pin plate 30 is in the first position and the shear plate 44 in the second position. To fully secure the standard pilot bit 66 in the arbor 10, the user moves the fastener 48 from the first position to the second position, thereby engaging the pilot bit 66 and preventing movement thereof relative to the arbor body.

If desired, a user may employ the fastener 48 to secure a quick change pilot bit 64 in addition to the securement provided by the pilot bit mechanism 40. As may be recognized by those of ordinary skill in the pertinent art based on the teachings herein, the order in which the respective hole cutter and pilot bit are mounted is inconsequential; rather, the hole cutter may be mounted before the pilot bit, after the pilot bit, or at about the same time as the pilot bit. Additionally, if desired, the arbor can be used with the hole cutter only (no pilot bit) or with the pilot bit only (no hole cutter).

Figure 20:
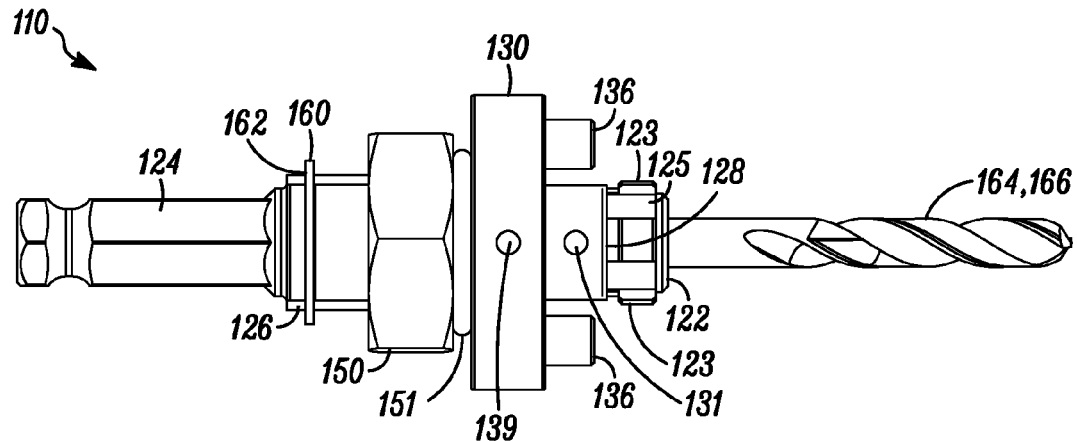
FIG. 20 is another embodiment of an arbor of the invention including a nut rotatably mounted on the arbor body for securing the axial position of the drive pin plate during use.
Figure 21:
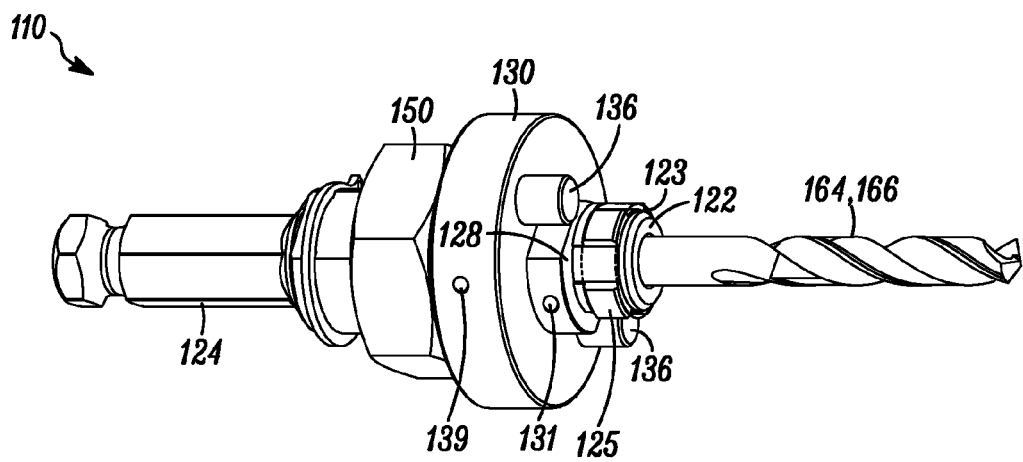
FIG. 21 is a perspective view of the arbor of FIG. 20.

In FIGS. 20 and 21 another arbor embodying the invention is indicated generally by the reference number 110. The arbor 110 is substantially similar to the arbor 10 described above in connection with FIGS. 1-19, and therefore like reference numerals preceded by the numeral "1" are used to indicate like elements. The primary difference of the arbor 110 in comparison to the arbor 10 described above, is that the arbor 110 does not include a collar 50 and biasing member 38 (see, e.g., FIGS. 1 and 3 above), but rather includes a nut 150 that threadedly engages the body portion 126 of the arbor body 120, and an o-ring 151 extending annularly about the body portion between the nut 150 and drive pin plate 130. The nut 150 is movable axially over the body portion 126 by rotating the nut to, in turn, move the nut between a first position spaced away from a hole cutter (not shown) attached to the connecting portion 122, as shown typically in FIGS. 20 and 21, and a second position engaging the drive pin plate 130 with the drive pins 136 received within the drive pin apertures of a hole saw to fixedly secure the drive pin plate to the hole saw (not shown). The o-ring 151 operates as a buffer between the nut 150 and drive pin plate 130 and otherwise allows a user to manually grip and turn the nut into engagement with the drive pin plate, and to manually grip and release the nut from the drive pin plate. In the illustrated embodiments, the nut 150 and the collar 50 prevent the drive pin plates 30, 130 from slipping off the rearward end of the arbor body 20, 120, and the threaded protrusions 23, 123 prevent the drive pin plates from slipping off the front end of the arbor body when not in use. As may be recognized by those or ordinary skill in the pertinent art based on the teachings herein, the arbors may include any of numerous different components that are currently known or that later become known for axially engaging the opposite side of the drive pin plate relative to the hole cutter to secure the axial position of the drive pin plate during use and/or to prevent the drive pin plate from slipping off the arbor body.

Figure 22:
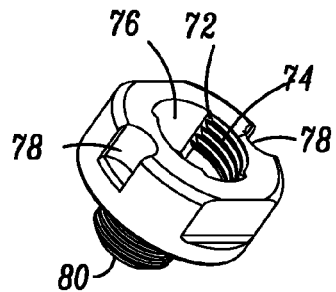
FIG. 22 is a perspective view of an adapter for connecting relatively small hole cutters to the arbors of the invention
Figure 23:
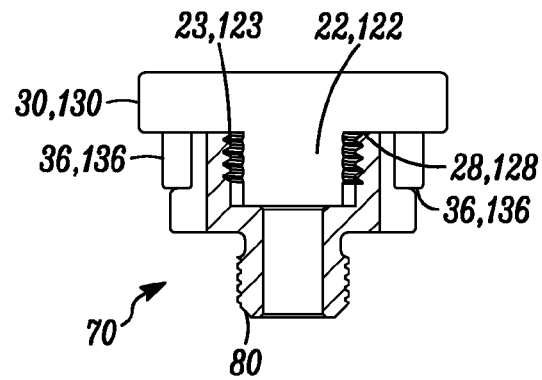
FIG. 23 is a cross-sectional view of the adapter of FIG. 22.
Figure 24:
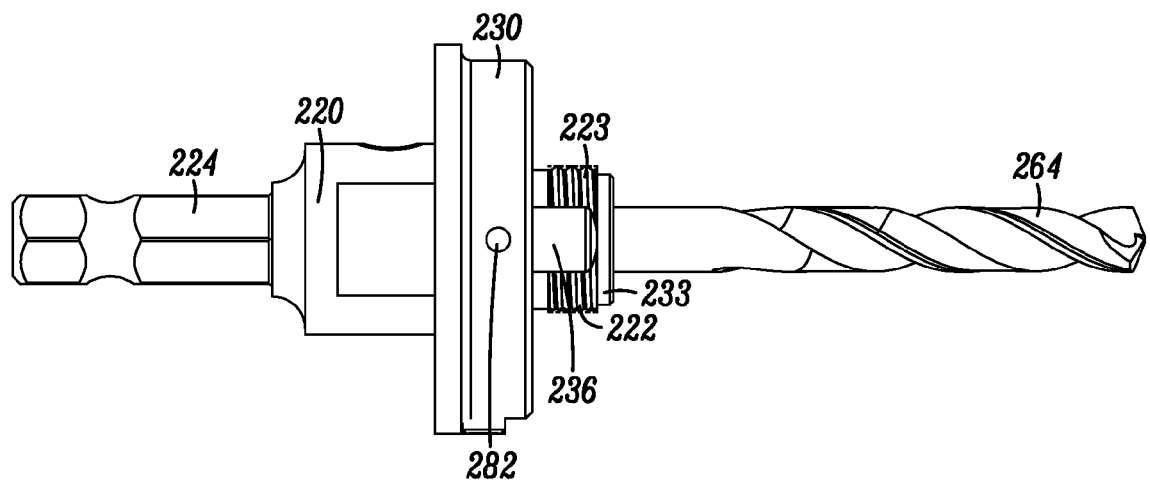
FIG. 24 is a side elevational view of another embodiment of an arbor of the invention wherein the drive pin plate is manually moved (rather than spring biased) between the engaged and disengaged positions, and including a ball detent mechanism for releasably securing the drive plate in the engaged position.

In FIGS. 22-23 an adapter for connecting relatively small hole cutters to the arbors of the invention is indicated generally by the reference numeral 70. The adapter 70 defines an adapter aperture 72 extending through an approximately central region thereof, a plurality of angularly extending protrusions 74 that project radially into the aperture 72 and are angularly spaced relative to each other about the periphery of the aperture, and a plurality of angularly extending recesses 76 formed between the protrusions 74. The protrusions 74 are threaded with a thread configuration that corresponds to and is engageable with the threaded portions 23, 123 of the end portions 22, 122 of the arbors 10, 110 for threadedly engaging the adapter to the arbors. The external periphery of the adapter 70 defines a plurality of curvilinear recesses 78 therein that are angularly spaced relative to each other about the external periphery, and are positioned relative to each other such that each recess 78 corresponds in position to, and receives therein a respective drive pin 36, 136 of the arbors when the adapter is attached to the arbor. The curvilinear shape of each recess 78 substantially conforms to the external shape of the respective drive pin to securely engage the respective drive pin and minimize any play therebetween. The underside of the adapter 70 includes a threaded boss 80 that is received within the threaded aperture on a hole cutter (not shown) to fixedly secure the hole cutter to the adapter. Accordingly, the adapter allows relatively small hole cutters that do not have drive pin apertures, or that do not have drive pin apertures that match the pattern of, or that otherwise are configured to receive the drive pins of the arbors.

In operation, the adapter 70 is attached to the hole saw by threadedly attaching the boss 80 to the hole saw. The assembled adapter and hole saw are attached to the arbor by inserting the threaded protrusions 23, 123 of the arbor end portion 22, 122 into the recesses 76 of the adapter to define the first engagement position. Then, at least one of the adapter/hole cutter assembly and arbor is rotated relative to the other to rotatably move from the first engagement position to the second engagement position. In the second engagement position, the protrusions 74 of the adapter threadedly engage the protrusions 23, 123 of the arbor to secure the adapter/hole cutter assembly to the arbor. When the adapter/hole cutter assembly and arbor are in the second engagement position, the drive pins are moved axially into the curvilinear recesses 78 to further prevent any relative rotational movement of the adapter and arbor during use and to rotatably drive the hole cutter. If desired, the axial depth of the adapter may be set so that the inner surface of the adapter engages the drive pin plate in the second engagement position. Also if desired, the threads on the threaded protrusions may define an axial clearance as described above in order to facilitate maintaining contact between the adapter and arbor shoulder 28, 128 in the first and second engagement positions.

In FIGS. 24-27 another arbor embodying the invention is indicated generally by the reference number 210. The arbor 210 is substantially similar to the arbors 10, 110 described above, and therefore like reference numerals preceded by the numeral "2", or preceded by the numeral "2" instead of the numeral "1", are used to indicate like elements. The primary difference of the arbor 210 in comparison to the arbor 10 described above, is that the arbor 210 does not include a biasing member 38 (see, e.g., FIGS. 1 and 3 above) for biasing the drive pin plate 230 in the direction from the second disengaged position, where the drive pin plate 230 is disengaged from the hole cutter, to the first engaged position, where the drive pin plate engages the hole cutter. Rather, the drive pin plate 230 is manually moved between the engaged and disengaged positions without the aid of a biasing member, and is maintained in the first engaged position by a ball detent mechanism 280. The ball detent mechanism 280 includes a ball 284 which is movable between a retracted position and an extended position, and a biasing member 286, such as a coil spring. The biasing member 286 biases the detent member 284 in the extended position. The ball detent 280 is housed within an aperture 282 defined in the drive pin plate 230. The aperture 282 extends radially between the drive pin plate aperture 232 and the outer surface of the drive pin plate 230.

A set-screw 288 is threaded into the aperture 282 to provide a backing surface against which the spring 286 can compress and serve as a mechanism for adjusting the tension in the spring 286. As may be recognized by those or ordinary skill in the pertinent art based on the teachings herein, the components of the ball detent mechanism may be substituted by any of numerous different components that are currently known or that later become known so long as the detent mechanism is able to secure the axial position of the drive pin plate relative to the arbor body during use and/or to prevent the drive pin plate from slipping out of engagement with the hole cutter. As may be recognized by those or ordinary skill in the pertinent art based on the teachings herein, the arbor 210 may include any of numerous different components that are currently known or that later become known to secure the axial position of the drive pin plate relative to the arbor body during use and/or to prevent the drive pin plate from slipping out of engagement with the hole cutter.

Figure 25:
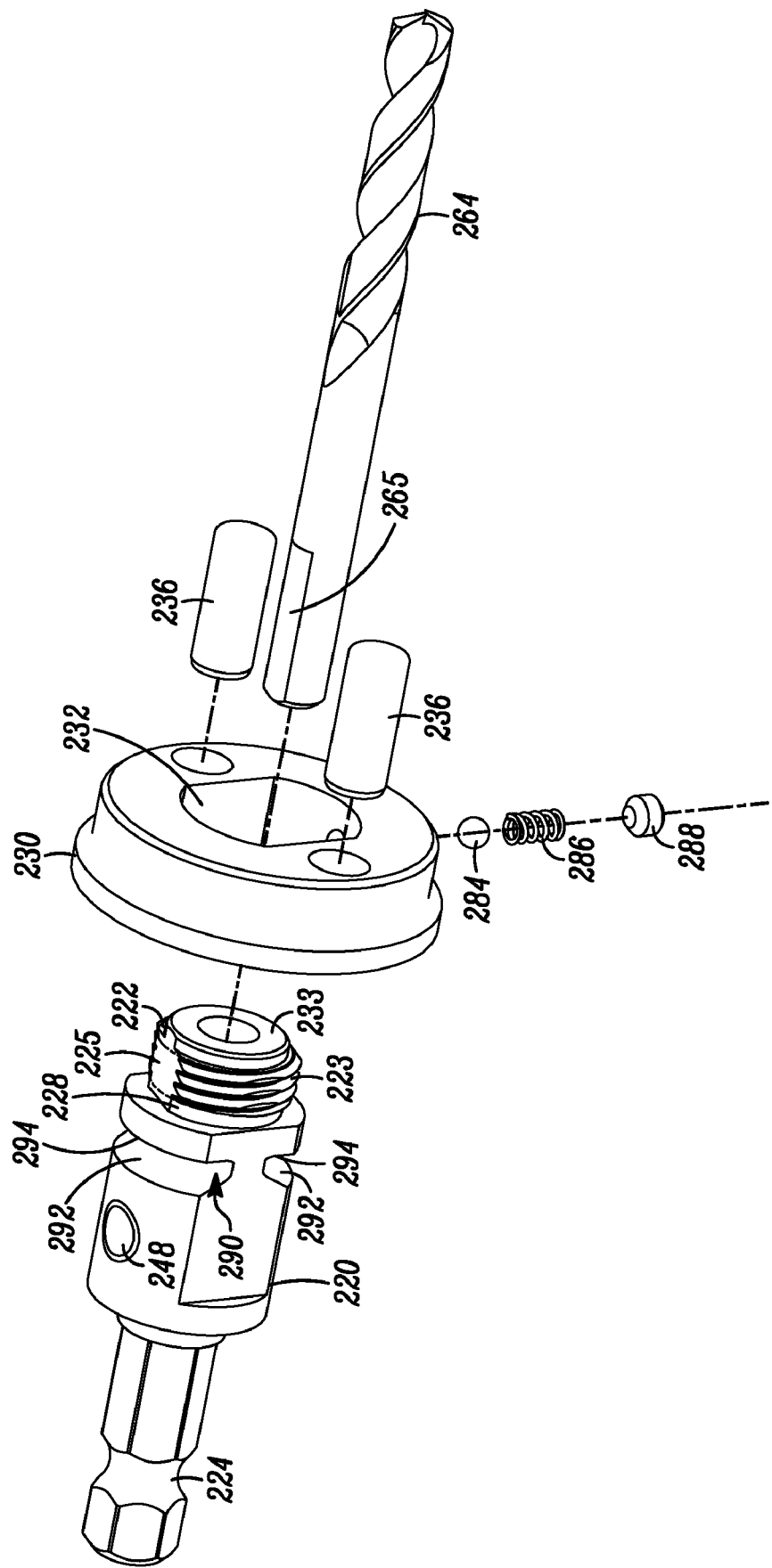
FIG. 25 is an exploded perspective view of the arbor of FIG. 24.
Figure 26:
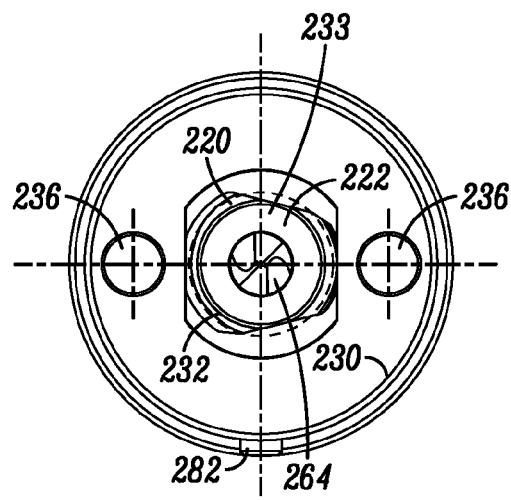
FIG. 26 is top plan view of the arbor of FIG. 24.
Figure 27:
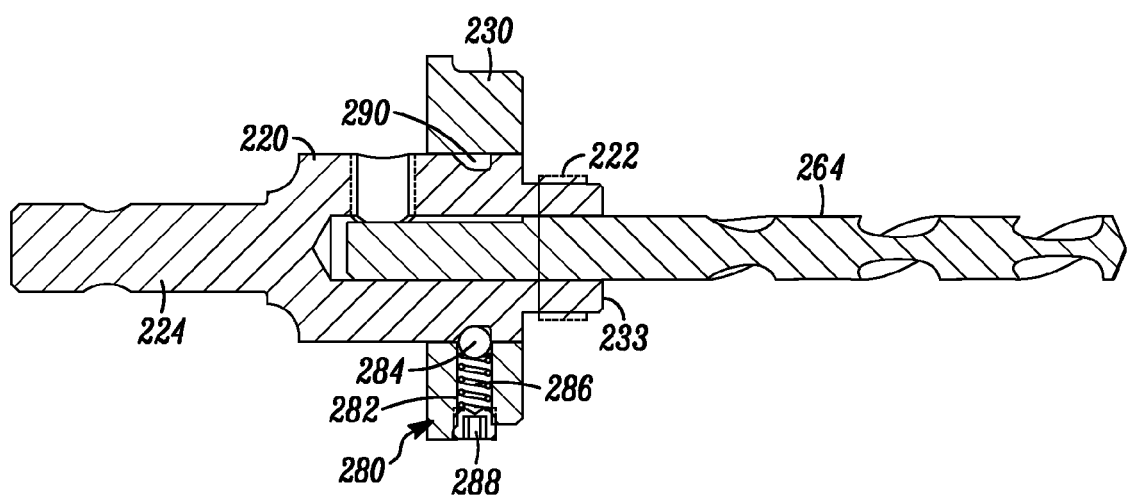
FIG. 27 is a cross-sectional view taken along line A-A of FIG. 26.

Referring to FIG. 25, the arbor body 220 defines a groove 290 located about the perimeter of the arbor body 220 towards the end portion 222. The groove 290 defines a first surface that is curved and/or angled towards the drive shank 224 and a second surface 294 that is substantially straight or substantially parallel to the end surface 233 of the connecting end portion 222. The groove 290 is configured in this manner to allow rearward movement of the drive pin plate 230 from the first engaged position to the second disengaged position, and to prevent further forward movement of the drive pin plate 230 beyond the first engaged position. As noted above, the ball 284 is movable between a retracted position and an extended position. In the extended position shown in FIG. 27, a portion of the ball 284 is seated within the groove 290 and portion of the ball is seated within the aperture 282, thereby securing the drive pin plate 230 axially in its first engaged position relative to the arbor body 220 to maintain engagement with the hole cutter. In the retracted position, the ball 284 is recessed within the aperture 282, allowing the drive pin plate 230 to move axially over the arbor body 220 and disengage from the hole cutter.

In operation, with the drive pin plate 230 in the first engaged position (see FIGS. 24 and 27) and engaging a hole cutter (not shown), a user grasps and manually moves the drive pin plate 30 rearward towards the drive shank 24. As the drive pin plate 230 begins to move, the ball 284 is forced against the curved and/or angled surface 292 of the groove 290 and, as the drive pin plate continues its rearward movement, the ball is forced out of the groove and into its retracted position within the aperture. With the ball in its retracted position, the pilot pin plate 230 is moved to its second position disengaging the hole cutter and allowing removal of the hole cutter. If a user decides to re-attach the hole cutter, or attach a replacement hole cutter, the cutter is threaded onto the end portion 222 of the arbor body 220 as described above. The user then grasps and manually moves the drive pin plate 230 in the forward direction away from the drive shank 224 until the aperture 282 is substantially aligned with the groove 290. As this occurs, the spring 286 biases the ball 284 into its extended position, thereby securing the axial position of the drive pin plate 230 relative to the arbor body 220 and into engagement with the hole cutter.

As may be recognized by those of ordinary skill in the pertinent art based on the teachings herein, numerous changes and modifications may be made to the above-described and other embodiments of the present invention without departing from the scope of the invention as defined in the appended claims. For example, the components of the arbor may take on any of numerous different configurations, or may be formed of any of numerous different materials, that are currently known, or that later become known; any of a variety of the disclosed components may be eliminated, or additional components or features may be added; and the arbors may be used with any of numerous different types of tools that are currently known, or that later become known. For example, the drive pins may take any of numerous different configurations, such as non-circular configurations, including for example, drive pins with flats that engage corresponding drive pin apertures or recesses on the hole cutter. Similarly, the drive pin apertures or recesses can take any of numerous different configurations for receiving or otherwise engaging any of numerous different types of drive pins. The drive pin member likewise can take any of numerous different configurations, including, for example, a plate form or a circular or other shaped collar or housing that is movable relative to the arbor body and includes one or more drive pins. The threads on the arbor connecting portion and/or on the central aperture of the hole cutter can take any of numerous different configurations that are currently known, or that later become known. Alternatively, the connecting portion and/or central aperture of the hole cutter may define a structure other than threads for engaging the hole cutter to the arbor upon moving the arbor and/or hole cutter relative to the other between the first and second engagement positions. Accordingly, this detailed description of the currently-preferred embodiments is to be taken in an illustrative, as opposed to a limiting sense.

What is claimed is:

1. An arbor that is connectable to a quick change hole cutter including an end portion defining a first aperture and at least one drive pin recess radially spaced relative to the first aperture, the arbor comprising:
an arbor body including a stop surface, and a hole cutter connecting portion extending axially from the stop surface and engageable within the first aperture of the hole cutter; and
a drive member defining a second aperture that receives therethrough the arbor body and is configured to allow relative axial movement, but to prevent relative rotational movement, of the arbor body and drive member, wherein
(i) the drive member further includes a first surface and at least one drive pin radially spaced relative to the second aperture and extending axially from the first surface;
(ii) the connecting portion is receivable within the first aperture of the hole cutter to define a first engagement position;
(iii) wherein the arbor is configured such that at least one of the arbor body and hole cutter is movable relative to the other between the first engagement position and a second engagement position to secure the hole cutter to the arbor body; and
(iv) in the second engagement position:
(a) the at least one drive pin is substantially alignable with the at least one corresponding drive pin recess of the hole cutter; and
(b) the drive member is movable axially relative to the arbor body between a disengaged position axially spaced relative to the hole cutter, and an engaged position, wherein the at least one drive pin is receivable within the corresponding drive pin recess of the hole cutter, and the first surface of the drive member is configured to contact the end portion of the hole cutter, and wherein the arbor is configured such that, in the second engagement position, the stop surface of the arbor body is arranged to be in contact with the end portion of the hole cutter.

2. An arbor as defined in claim 1 in combination with a hole cutter connected with the arbor, the hole cutter including an end portion defining a first aperture and at least one drive pin recess radially spaced relative to the first aperture.

3. An arbor as defined in claim 1, wherein the connecting portion of the arbor body defines a first thread threadedly engageable with a second thread defined by the first aperture of the hole cutter to fixedly secure the hole cutter to the arbor body in the second engagement position.

4. An arbor as defined in claim 3, wherein the first thread is configured to substantially align the at least one drive pin with the at least one corresponding drive pin recess of the hole cutter in the second engagement position.

5. An arbor as defined in claim 4, wherein the first thread is configured to define an axial clearance with the second thread, allowing the end portion of the hole cutter to substantially contact the stop surface of the arbor body in the both the first engagement position and the second engagement position.

6. An arbor as defined in claim 5, wherein an angular extent between the first and second engagement positions is within the range of about 10° and about 180°.

7. An arbor as defined in claim 1, wherein:
the connecting portion of the arbor body defines a plurality of angularly extending protrusions and a plurality of relatively recessed portions formed therebetween;
the protrusions of the connecting portion are configured to be received within a plurality of relatively recessed portions defined by the first aperture between a plurality of angularly extending protrusions defined by the first aperture, and the recessed portions of the connecting portion are configured for receiving the protrusions of the first aperture, in the first engagement position; and
the protrusions of the connecting portion are configured for engagement with the protrusions of the first aperture in the second engagement position.

8. An arbor as defined in claim 7, wherein the protrusions of the connecting portion define a first thread configured for threaded engagement with a second thread defined by the protrusions of the first aperture in the second engagement position.

9. An arbor as defined in claim 7, wherein at least one of the angularly extending protrusions of the connecting portion defines a greater or lesser angular extent than at least one other angular extending protrusion of the connecting portion, thereby permitting receipt of the connecting portion within the first aperture in only the first engagement position.

10. An arbor as defined in claim 1, wherein the connecting portion of the arbor is threadedly engageable with both a threaded aperture of the quick change hole cutter and a threaded aperture of a standard hole cutter.

11. An arbor as defined in claim 1, further comprising a biasing member that normally biases the drive member in a direction from the disengaged into the engaged position.

12. An arbor as defined in claim 1, wherein the arbor body further defines a pilot bit aperture that is configured to alternatively receive both a quick change pilot bit and a standard pilot bit, and the arbor further comprises (i) a pilot pin biased radially inwardly toward the pilot bit aperture and engageable with a quick change pilot bit received within the pilot bit aperture, and (ii) a fastener movable into the pilot bit aperture and engageable with a standard pilot bit received within the pilot bit aperture.

13. An arbor as defined in claim 1, wherein the arbor body further defines a pilot bit aperture for alternatively receiving both a quick change pilot bit and a standard pilot bit, and the arbor further comprises a pilot bit mechanism defining (i) a first state wherein the pilot bit mechanism engages the quick change pilot bit to prevent movement of the bit relative to the arbor body; (ii) a second state wherein the pilot bit mechanism engages the standard pilot bit to prevent movement of the bit relative to the arbor body; and (iii) a third state wherein the pilot bit mechanism disengages from the respective quick change pilot bit or standard pilot bit and allows movement of the respective bit relative to the arbor body.

14. An arbor as defined in claim 13, wherein the pilot bit mechanism comprises:
  a pilot pin movable between a first position corresponding to the first state of the pilot bit mechanism, and a second position corresponding to at least one of the second and third states of the pilot bit mechanism;
  a second biasing member that biases the pilot pin in the direction from the second position to the first position; and
  a fastener that is movable between a first position corresponding to one of the first and second states, and a second position corresponding to the third state, wherein the fastener is alternatively engageable with both the quick change and standard pilot bits when the pilot bit mechanism is in one of the first and second states, respectively.

15. An arbor as defined in claim 14, wherein the pilot bit mechanism further comprises a shear plate movable between a first position corresponding to the first and third states, and a second position corresponding to the second state of the pilot bit mechanism; a shear pin movable between a first position corresponding to the first state, and a second position corresponding to the second and third states of the pilot bit mechanism; and a third biasing member that biases the shear pin radially inwardly; wherein the shear plate defines an aperture for receiving therein at least a portion of at least one of the pilot pin and shear pin, and prevents the pilot pin from moving from the first position to the second position when the pilot bit mechanism is in the first state to, in turn, prevent the pilot bit from moving relative to the arbor body.

16. An arbor body as defined in claim 15, wherein the shear plate defines a shear plate aperture, and in the third state at least a portion of the pilot pin is receivable within the shear plate aperture to alternatively allow both the quick change pilot bit and standard pilot bit to be at least one of (i) inserted into the pilot bit aperture and (ii) removed from the pilot bit aperture.

17. An arbor body as defined in claim 1, further comprising an adapter for connecting a relatively small hole cutter to the arbor, the adapter defining an aperture including along a periphery thereof a plurality of angularly extending protrusions and a plurality of recesses formed therebetween, and defining on an external periphery thereof at least one drive pin recess for receiving therein a respective drive pin.

18. An arbor as defined in claim 1, further including a biasing device that normally biases the drive member in a direction from the disengaged toward the engaged position.

19. An arbor that is connectable to a quick change hole cutter including an end portion defining a first aperture and at least one recess radially spaced relative to the first aperture, the arbor comprising:
  first means for drivingly connecting a power tool to the hole cutter, and including a stop surface, and second means extending axially relative to the stop surface for releasably engaging the first aperture of the hole cutter and defining a first engagement position;
  third means for receiving therethrough the first means and for allowing relative axial movement, but preventing relative rotational movement, of the first means and the third means, wherein the third means includes a first surface and at least one fourth means extending axially from the first surface for receipt within the at least one recess of the hole cutter for rotatably driving the hole cutter; and
  fifth means for allowing rotational movement of at least one of the first means and the hole cutter relative to the other between the first engagement position and a second engagement position for securing the hole cutter to the first means, and for (i) substantially aligning the at least one fourth means with the at least one recess of the hole cutter in the second engagement position for allowing, in turn, axial movement of the third means relative to the first means in the second engagement position between a disengaged position axially spaced relative to the hole cutter, and an engaged position with the at least one fourth means received within the at least one recess of the hole cutter, and (ii) placing the first surface of the third means in substantial contact with the end portion of the hole cutter in the second engagement position, wherein
  the arbor is configured such that, in the second engagement position, the stop surface of the first means is arranged to be in contact with the end portion of the hole cutter.

20. An arbor as defined in claim 19, wherein the first means is an arbor body, the second means is a connecting portion of the arbor body, the third means is a drive member, the fourth means is a drive pin, and the fifth means is a first threaded portion formed on the arbor body connecting portion configured to be threadedly engageable with a second threaded portion formed on the first aperture of the hole cutter.

21. An arbor as defined in claim 19, further comprising sixth means for biasing the third means in a direction from the disengaged position to the engaged position.

22. A quick change hole cutter attachable to an arbor including a threaded end portion defining at least one male threaded portion, a stop surface located adjacent to the threaded end portion, and a drive member including at least one drive pin thereon and movable axially relative to the arbor between an engaged position with the drive pin engaging the hole cutter and a disengaged position with the drive pin disengaged from the hole cutter, the quick change hole cutter comprising:
  a blade including a blade body and a cutting edge defined by a plurality of cutting teeth; and
  an end portion fixedly secured to the blade body and defining an approximately central aperture including on a peripheral portion thereof at least one female threaded portion, and at least one drive pin recess radially spaced relative to the central aperture, wherein the at least one female threaded portion is configured to cooperate with the at least one male threaded portion of the arbor and define (i) a first engagement position wherein lead female threads of the at least one female threaded portion are substantially engageable with and define a first axial clearance relative to lead male threads of the at least one male threaded portion, and (ii) a second engagement position angularly spaced relative to the first engagement position, wherein the female threads are engageable with the male threads and define a second axial clearance less than the first axial clearance, the end portion is substantially engageable with the stop surface of the arbor, and the at least one drive pin recess is alignable with a respective drive pin of the arbor for receiving the at least one drive pin with the drive member located in the engagement position.

23. A quick change hole cutter as defined in claim 22, wherein the at least one female threaded portion defines an axial clearance relative to the at least one male threaded portion allowing the end portion of the hole cutter to substantially contact the stop surface of the arbor body in the both the first engagement position and the second engagement position.

24. A quick change hole cutter as defined in claim 22, wherein:
the at least one female threaded portion of the quick change hole cutter defines a plurality of angularly extending protrusions and a plurality of relatively recessed portions formed therebetween;
the recesses of the at least one female threaded portion are configured to receive a plurality of angularly extending protrusions defined by the at least one male threaded portion of the arbor formed between a plurality of relatively recessed portions defined by the at least one male threaded portion, and the protrusions of the at least one female threaded portion are configured to be received within the recessed portions of the at least one male threaded portion, in the first engagement position; and
the protrusions of the at least one female threaded portion are configured for engagement with the protrusions of the at least one male threaded portion in the second engagement position.

25. A quick change hole cutter as defined in claim 24, wherein at least one of the angularly extending protrusions of the at least one female threaded portion defines a greater or lesser angular extent than at least one other angular extending protrusion of the at least one female threaded portion, thereby permitting receipt of the at least one male threaded portion within the at least one female threaded portion in only the first engagement position.

26. A quick change hole cutter as defined in claim 22, wherein the at least one female threaded portion defines a minimum axial clearance relative to the at least one male threaded portion approximately equal to ((1/pitch)/360))*D, wherein D is approximately equal to the degree of rotation between the first and second engagement positions.

27. A quick change hole cutter attachable to an arbor including a threaded end portion defining at least one male threaded portion, a stop surface located adjacent to the threaded end portion, and a drive member including at least one drive pin thereon and movable axially relative to the arbor between an engaged position with the drive pin engaging the hole cutter and a disengaged position with the drive pin disengaged from the hole cutter, the quick change hole cutter comprising:
first means for cutting a hole; and
second means for releasably connecting the first means to the arbor, the second means including third means for engaging the end portion of the arbor in a first engagement position and for defining a first axial clearance between the third means and the at least one male threaded portion of the threaded end portion of the arbor, for allowing relative rotational movement of at least one of the hole cutter and arbor body relative to the other between the first engagement position and a second engagement position angularly spaced relative to the first engagement position, and for defining a second axial clearance therebetween less than the first axial clearance, and for placing the second means in engagement or substantial engagement with the stop surface of the arbor, and fourth means alignable with the at least one drive pin of the arbor in the second engagement position for receiving the at least one drive pin with the drive member located in the second engagement position.

28. A quick change hole cutter as defined in claim 27, wherein the first means is a hole cutter blade, the second means is an end portion of the hole cutter, the third means is a threaded aperture in the end portion of the hole cutter, and the fourth means is a drive pin recess in the end portion of the hole cutter.

29. A method comprising the following steps:
connecting an arbor and a hole cutter, wherein:
the hole cutter has an end portion defining a first aperture and at least one drive pin recess radially spaced relative to the first aperture, and
the arbor includes an axially-elongated arbor body having a connecting portion that is connectable to the hole cutter and a drive member movable axially, but not rotationally, relative to the arbor body, and including at least one drive pin extending therefrom;
wherein the connecting step includes the steps of:
non-rotatably inserting the connecting portion of the arbor body into the first aperture of the hole cutter to define a first engagement position;
moving at least one of the arbor body and hole cutter relative to the other between the first engagement position and a second engagement position and, in turn, securing the hole cutter to the arbor body; and
upon moving at least one of the arbor body and hole cutter relative to the other into the second engagement position, (i) substantially aligning the at least one drive pin with the at least one drive pin recess of the hole cutter in the second engagement position, and then (ii) either moving or allowing axial movement of the drive member relative to the arbor body between a first position axially spaced relative to the hole cutter, and a second position with the at least one drive pin axially received within the at least one drive pin recess of the hole cutter and, in turn, placing the drive member in substantial contact with the end portion of the hole cutter.

30. A method as defined in claim 29, wherein:
the hole cutter includes a first aperture defining along a periphery thereof a plurality of angularly extending protrusions and a plurality of recesses formed therebetween;
the connecting portion defining a plurality of angularly extending protrusions and a plurality of recesses formed therebetween;
the step of inserting comprises inserting at least one of the protrusions of the connecting portion and the protrusions of the first aperture into the recesses of the other, and, in turn, defining the first engagement position; and
the step of moving at least one of the arbor and hole cutter relative to the other from the first engagement position into a second engagement position comprises rotating at least one of the hole cutter and arbor body relative to the other from the first engagement position to the second engagement position and, in turn, engaging at least one of the protrusions of the connecting portion and of the first aperture with the other.

31. A method as defined in claim 30, further comprising the step of substantially simultaneously moving the drive member from the first position to the second position during the step of inserting at least one of the protrusions of the connecting portion and the protrusions of the first aperture into the recesses of the other.

32. A method as defined in claim 29, wherein the arbor includes a first biasing member that biases the drive member, the method further comprising compressing the first biasing member during the step of moving the drive member from the first position to the second position.

33. An arbor that is connectable to a quick change hole cutter including an end portion defining a first aperture and at least one drive pin recess radially spaced relative to the first aperture, the arbor comprising:
    an arbor body including a stop surface, and a hole cutter connecting portion extending axially from the stop surface and engageable within the first aperture of the hole cutter; and
    a drive member defining a second aperture that receives therethrough the arbor body and is configured to allow relative axial movement, but to prevent relative rotational movement, of the arbor body and drive member, wherein
    (i) the drive member further includes a first surface and at least one drive pin radially spaced relative to the second aperture and extending axially from the first surface;
    (ii) the connecting portion is receivable within the first aperture of the hole cutter to define a first engagement position;
    (iii) wherein the arbor is configured such that at least one of the arbor body and hole cutter is movable relative to the other between the first engagement position and a second engagement position to secure the hole cutter to the arbor body; and
    (iv) in the second engagement position:
        (a) the at least one drive pin is substantially alignable with the at least one corresponding drive pin recess of the hole cutter; and
        (b) the drive member is movable axially relative to the arbor body between a disengaged position axially spaced relative to the hole cutter, and an engaged position, wherein the at least one drive pin is receivable within the at least one corresponding drive pin recess of the hole cutter, and the first surface of the drive member is configured to contact the end portion of the hole cutter, wherein:
    the connecting portion of the arbor body defines a plurality of angularly extending protrusions and a plurality of relatively recessed portions formed therebetween;
    the protrusions of the connecting portion are configured to be received within a plurality of relatively recessed portions defined by the first aperture between a plurality of angularly extending protrusions defined by the first aperture, and the recessed portions of the connecting portion are configured for receiving the protrusions of the first aperture, in the first engagement position; and
    the protrusions of the connecting portion are configured for engagement with the protrusions of the first aperture in the second engagement position.

34. An arbor as defined in claim 33, wherein the protrusions of the connecting portion define a first thread configured for threaded engagement with a second thread defined by the protrusions of the first aperture in the second engagement position.

35. An arbor as defined in claim 33, wherein at least one of the angularly extending protrusions of the connecting portion defines a greater or lesser angular extent than at least one other angular extending protrusion of the connecting portion, thereby permitting receipt of the connecting portion within the first aperture in only the first engagement position.

36. An arbor that is connectable to a quick change hole cutter including an end portion defining a first aperture and at least one drive pin recess radially spaced relative to the first aperture, the arbor comprising:
    an arbor body including a stop surface, a hole cutter connecting portion extending axially from the stop surface and engageable within the first aperture of the hole cutter, and a pilot bit aperture that is configured to alternatively receive both a quick change pilot bit and a standard pilot bit, and the arbor further comprises (i) a pilot pin biased radially inwardly toward the pilot bit aperture and engageable with a quick change pilot bit received within the pilot bit aperture, and (ii) a fastener movable into the pilot bit aperture and engageable with a standard pilot bit received within the pilot bit aperture; and
    a drive member defining a second aperture that receives therethrough the arbor body and is configured to allow relative axial movement, but to prevent relative rotational movement, of the arbor body and drive member, wherein
    (i) the drive member further includes a first surface and at least one drive pin radially spaced relative to the second aperture and extending axially from the first surface;
    (ii) the connecting portion is receivable within the first aperture of the hole cutter to define a first engagement position;
    (iii) wherein the arbor is configured such that at least one of the arbor body and hole cutter is movable relative to the other between the first engagement position and a second engagement position to secure the hole cutter to the arbor body; and
    (iv) in the second engagement position:
        (a) the at least one drive pin is substantially alignable with the at least one corresponding drive pin recess of the hole cutter; and
        (b) the drive member is movable axially relative to the arbor body between a disengaged position axially spaced relative to the hole cutter, and an engaged position, wherein the at least one drive pin is receivable within the at least one corresponding drive pin recess of the hole cutter, and the first surface of the drive member is configured to contact the end portion of the hole cutter.

37. An arbor that is connectable to a quick change hole cutter including an end portion defining a first aperture and at least one drive pin recess radially spaced relative to the first aperture, the arbor comprising:
    an arbor body including a stop surface, a hole cutter connecting portion extending axially from the stop surface and engageable within the first aperture of the hole cutter, and a pilot bit aperture for alternatively receiving both a quick change pilot bit and a standard pilot bit, and the arbor further comprises a pilot bit mechanism defining (i) a first state wherein the pilot bit mechanism engages the quick change pilot bit to prevent movement of the bit relative to the arbor body; (ii) a second state wherein the pilot bit mechanism engages the standard pilot bit to prevent movement of the bit relative to the arbor body; and (iii) a third state wherein the pilot bit mechanism disengages from the respective quick change pilot bit or standard pilot bit and allows movement of the respective bit relative to the arbor body; and
    a drive member defining a second aperture that receives therethrough the arbor body and is configured to allow relative axial movement, but to prevent relative rotational movement, of the arbor body and drive member, wherein
(i) the drive member further includes a first surface and at least one drive pin radially spaced relative to the second aperture and extending axially from the first surface;
(ii) the connecting portion is receivable within the first aperture of the hole cutter to define a first engagement position;
(iii) wherein the arbor is configured such that at least one of the arbor body and hole cutter is movable relative to the other between the first engagement position and a second engagement position to secure the hole cutter to the arbor body; and
(iv) in the second engagement position:
(a) the at least one drive pin is substantially alignable with the at least one corresponding drive pin recess of the hole cutter; and
(b) the drive member is movable axially relative to the arbor body between a disengaged position axially spaced relative to the hole cutter, and an engaged position, wherein the at least one drive pin is receivable within the at least one corresponding drive pin recess of the hole cutter, and the first surface of the drive member is configured to contact the end portion of the hole cutter.

38. An arbor as defined in claim 37, wherein the pilot bit mechanism comprises:
a pilot pin movable between a first position corresponding to the first state of the pilot bit mechanism, and a second position corresponding to at least one of the second and third states of the pilot bit mechanism;
a second biasing member that biases the pilot pin in a direction from the second position to the first position; and
a fastener that is movable between a first position corresponding to one of the first and second states, and a second position corresponding to the third state, wherein the fastener is alternatively engageable with both the quick change and standard pilot bits when the pilot bit mechanism is in one of the first and second states, respectively.

39. An arbor as defined in claim 38, wherein the pilot bit mechanism further comprises a shear plate movable between a first position corresponding to the first and third states, and a second position corresponding to the second state of the pilot bit mechanism; a shear pin movable between a first position corresponding to the first state, and a second position corresponding to the second and third states of the pilot bit mechanism; and a third biasing member that biases the shear pin radially inwardly; wherein the shear plate defines an aperture for receiving therein at least a portion of at least one of the pilot pin and shear pin, and prevents the pilot pin from moving from the first position to the second position when the pilot bit mechanism is in the first state to, in turn, prevent the pilot bit from moving relative to the arbor body.

40. An arbor body as defined in claim 39, wherein the shear plate defines a shear plate aperture, and in the third state at least a portion of the pilot pin is receivable within the shear plate aperture to alternatively allow both the quick change pilot bit and standard pilot bit to be at least one of (i) inserted into the pilot bit aperture and (ii) removed from the pilot bit aperture.

41. An arbor that is connectable to a quick change hole cutter including an end portion defining a first aperture and at least one drive pin recess radially spaced relative to the first aperture, the arbor comprising:
an arbor body including a stop surface, and a hole cutter connecting portion extending axially from the stop surface and engageable within the first aperture of the hole cutter;
a drive member defining a second aperture that receives therethrough the arbor body and is configured to allow relative axial movement, but to prevent relative rotational movement, of the arbor body and drive member, wherein
(i) the drive member further includes a first surface and at least one drive pin radially spaced relative to the second aperture and extending axially from the first surface;
(ii) the connecting portion is receivable within the first aperture of the hole cutter to define a first engagement position;
(iii) wherein the arbor is configured such that at least one of the arbor body and hole cutter is movable relative to the other between the first engagement position and a second engagement position to secure the hole cutter to the arbor body; and
(iv) in the second engagement position:
(a) the at least one drive pin is substantially alignable with the at least one corresponding drive pin recess of the hole cutter; and
(b) the drive member is movable axially relative to the arbor body between a disengaged position axially spaced relative to the hole cutter, and an engaged position, wherein the at least one drive pin is receivable within the at least one corresponding drive pin recess of the hole cutter, and the first surface of the drive member is configured to contact the end portion of the hole cutter; and
further comprising an adapter configured to connect a relatively small hole cutter to the arbor, the adapter defining an aperture including along a periphery thereof a plurality of angularly extending protrusions and a plurality of recesses formed therebetween, and defining on an external periphery thereof at least one drive pin recess for receiving therein a respective drive pin.

42. A quick change hole cutter as defined in claim 22 in combination with an arbor attached to the quick change hole cutter, the arbor including a threaded end portion defining at least one male threaded portion, a stop surface located adjacent to the threaded end portion, and a drive member including at least one drive pin thereon and movable axially relative to the arbor between an engaged position and a disengaged position.

43. A quick change hole cutter as defined in claim 27 in combination with an arbor attached to the quick change hole cutter, the arbor including a threaded end portion defining at least one male threaded portion, a stop surface located adjacent to the threaded end portion, and a drive member including at least one drive pin thereon and movable axially relative to the arbor between an engaged position and a disengaged position.

* * * * *

UNITED STATES PATENT AND TRADEMARK OFFICE
CERTIFICATE OF CORRECTION

PATENT NO. : 8,328,474 B2
APPLICATION NO. : 12/043740
DATED : December 11, 2012
INVENTOR(S) : Joseph Thomas Novak and James E. Pangerc Page 1 of 1

It is certified that error appears in the above-identified patent and that said Letters Patent is hereby corrected as shown below:

On the Title Page, Item (75) Inventors:

James E. Pangerc, East Longmeadow, MA (US)
Joseph Thomas Novak, East Longmeadow, MA (US)

should be changed to:

--Joseph Thomas Novak, East Longmeadow, MA (US)
James E. Pangerc, East Longmeadow, MA (US)--

Signed and Sealed this
Fourteenth Day of May, 2013

Teresa Stanek Rea
*Acting Director of the United States Patent and Trademark Office*